(12) United States Patent
Eguchi et al.

(10) Patent No.: US 7,076,152 B1
(45) Date of Patent: Jul. 11, 2006

(54) IMAGE RECORDING SYSTEM

(75) Inventors: Tatsuo Eguchi, Kanagawa (JP);
Yasuhiko Terashita, Kanagawa (JP);
Yasuo Nomura, Kanagawa (JP);
Yasushi Miyajima, Kanagawa (JP);
Yoshikazu Watanabe, Kanagawa (JP);
Nobuaki Yamaguchi, Tokyo (JP);
Kumiko Sasaki, Kanagawa (JP);
Makoto Niijima, Tokyo (JP); Al
Suzuki, Tokyo (JP); Shinya Fujii,
Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/720,129

(22) PCT Filed: Apr. 24, 2000

(86) PCT No.: PCT/JP00/02672

§ 371 (c)(1),
(2), (4) Date: May 18, 2001

(87) PCT Pub. No.: WO00/65835

PCT Pub. Date: Nov. 2, 2000

(30) Foreign Application Priority Data

Apr. 26, 1999 (JP) ............................. P11-118766
Jul. 23, 1999 (JP) ............................. P11-208872

(51) Int. Cl.
*H04N 5/91* (2006.01)
(52) U.S. Cl. ........................ 386/83; 386/46; 725/131
(58) Field of Classification Search .............. 386/1, 386/46, 83, 111, 112, 45; 360/79; 725/131, 725/139, 1, 151
See application file for complete search history.

(56) References Cited

U.S. PATENT DOCUMENTS

| 5,727,060 | A | * | 3/1998 | Young ........................ 386/83 |
| 5,761,606 | A | | 6/1998 | Wolzien |
| 6,169,844 | B1 | * | 1/2001 | Arai ........................... 386/83 |
| 6,195,501 | B1 | * | 2/2001 | Perry et al. .................. 386/83 |
| 6,631,523 | B1 | * | 10/2003 | Matthews et al. .......... 725/131 |
| 6,836,296 | B1 | * | 12/2004 | Terakado et al. ............. 386/83 |

FOREIGN PATENT DOCUMENTS

| JP | 57-112125 | 7/1982 |
| JP | 1-305716 | 12/1989 |
| JP | 6-14288 | 1/1994 |
| JP | 6-162252 | 6/1994 |
| JP | 7-212732 | 8/1995 |
| JP | 7-298369 | 11/1995 |
| JP | 8-102107 | 4/1996 |
| JP | 8-214282 | 8/1996 |
| JP | 9-37180 | 2/1997 |
| JP | 9-247598 | 9/1997 |
| JP | 9-298775 | 11/1997 |
| JP | 10-32802 | 2/1998 |
| JP | 10-155131 | 6/1998 |
| JP | 10-177777 | 6/1998 |

(Continued)

*Primary Examiner*—James J. Groody
*Assistant Examiner*—Christopher Onuaku
(74) *Attorney, Agent, or Firm*—Oblon, Spivak, McClelland, Maier & Neustadt, P.C.

(57) ABSTRACT

An information processing method and apparatus, an information furnishing method and apparatus, a picture recording system and a medium, in which reservation recording can be performed readily and promptly. To this end, a message asking a server for recording reservation data is transmitted at step S11, data for recording reservation, transmitted from the server, is received at step S13, and control is managed to record a pre-set picture at step S16 based on the recording reservation data.

6 Claims, 26 Drawing Sheets

FOREIGN PATENT DOCUMENTS

| | | |
|---|---|---|
| JP | 10-200847 | 7/1998 |
| JP | 10-222889 | 8/1998 |
| JP | 10-247345 | 9/1998 |
| JP | 10-261251 | 9/1998 |
| JP | 10-269754 | 10/1998 |
| JP | 10-289205 | 10/1998 |

* cited by examiner

NEW RESERVE···SET CHANNEL & START DATA & TIME

CHANNEL & START DATA & TIME SET

| CHANNEL | 18ch FUJI TV |
| START DATE | FEB 28, 1999 |
| START TIME | 16 HR | 30 MIN |

[ CANCEL ]  [ NEXT ]  [ HELP ]

FIG.13

NEW RESERVE···SET END TIME & RECORDING MODE

RECORDING RESERVE END TIME & RECORDING MODE SET

CHANNEL  18ch FUJI TV

START TIME  FEB 28, 1999  16HR 30MIN

END TIME  FEB 28, 1999  18 HR  30 MIN

RECORDING MODE  STANDARD

RECORDING TIME :  1HR 00MIN
USED DISC CAPACITY :  2574.92MB
NON-USED DISC CAPACITY :  9999.00MB

[ CANCEL ]  [ RETURN ]  [ NEXT ]  [ HELP ]

FIG.14

| NEW RESERVE · · ·CONFIRMATION | |
|---|---|
| RESERVE RECORDING TO BE MADE BY FOLLOWING SETTING-OK ? | |
| START TIME : | FEB 16, 1999 16HR 30MIN |
| END TIME : | FEB 16, 1999 18HR 30MIN |
| CHANNEL : | 8ch FUJI TV |
| RECORDING MODE : | STANDARD |
| PERIODIC : | ONCE |
| TERM OF VALIDITY OF CONTENTS : | NONE |
| CONTENT NAME : | HOGEHOGE |
| LIBRARY OF DESTINATION OF STORAGE : | TEMPORARY STORAGE |
| MEMO : | |

CANCEL    RETURN    COMPLETE    HELP

FIG.15

| GUIDE | | 1ch | | 3ch | | 4ch | | 6ch |
|---|---|---|---|---|---|---|---|---|
| | | NHK GENERAL | | NHK EDUCATIONAL | | NTV | | TBS |
| 19 HOUR | 0 | 7 HR NEWS<br>▷ TODAY'S NEWS<br>▷ SPORTS CORNER<br>▷ STOCK DATA<br>▷ WEATHER DATA<br>CASTOR  251-1 R<br>             251-2 R | 0 | AFTER SCHOOL CLUB<br>WELCOME JUNIOR<br>              251-5 R<br>              251-6 R | 0 | PROFESSIONAL BASEBALL<br>[GIANTS × DRAGONS]<br>TOKYO DOME<br>COMMENTATOR:<br>PITCHER MOTODAI<br>CASTOR:SABURO NIIDATE<br>                    251-10 R | 0 | FRIDAY TV 1<br>[EMERGENCY HOSPITAL 24 HRS]<br>                      251-11 R |
| | 57 | TV MAP | 30 | DACTYLOLOGY | | | | |
| | | | 45 | HEALTH FOR TOMORROW 251-7 R | | | | |
| 20 HOUR | 0 | DRAMA<br>[NANTARA-KANTARA]<br>              251-3 R | 0 | TONIGHT WITH YOU<br>              251-8 R | | | | |
| | 45 | WEATHER FOR LOCAL 251-4 R | 30 | LET'S LEARN BRAILLE<br>              251-9 R | | | | |

FIG.16

```
Content-type : application/x-tv-program-info : charset=shift_jis
version : 1
station : NTV
year : 1999
month : 04
date : 06
start : 21:00
end : 21:03
program-title : TUESDAY SUSPENSE QUIZ WHO IS CRIMINAL ?
```

FIG.17

```
1, 0, 0, 1, NHK GENERAL, NHK GENERAL, NHK
3, 0, 0, 3, NHK EDUCATIONAL, NHK EDUCATIONAL, NHK2
4, 0, 0, 4, NIPPON TV, NIPPON TV, NI-TEL, NIPPON TV B NETWORK, NTV
5, 0, 0, 5, SCOPE, SCOPE
6, 0, 0, 6, TOKYO B, TOKYO B, TBS TV, TBS
8, 0, 0, 8, FUJI TV, FUJI TV, FUJI TELEVISION, CX, FUJI
7, 0, 0, 7, VAIO TV, VAIO TV, VAIO
9, 0, 0, 9, NHK SATELLITE (2), NHK SATELLITE (2), BS2, NHKBS2
10, 0, 0, 10, TV ASAHI, TV ASAHI, ZENKOKU ASAHI B, TV-ASAHI, TEL-ASA, ANB, TVASA
11, 0, 0, 11, NHK SATELLITE (1), NHK SATELLITE (1), BS1, NHKBS1
12, 0, 0, 12, TV TOKYO, TV TOKYO, TEL-T, TV TOKYO, TX, TVTOK
```

FIG.18

IMAGE RECORDING SYSTEM

TECHNICAL FIELD

This invention relates to an information processing method and apparatus, an information furnishing method and apparatus, a picture recording system and a medium. More particularly, it relates to an information processing method and apparatus, an information furnishing method and apparatus, a picture recording system and a medium in which pre-set broadcast is received and recorded by reservation recording.

BACKGROUND ART

The technology of having a tuner enclosed in a personal computer to receive signals of pictures and speech from a television broadcasting station, converting the received pictures and speech into pre-set digital data to record the converted data on a recording medium, such as a hard disc, and of reproducing the recorded data in case of necessity, is finding widespread application.

In such personal computer, setting a channel for reservation recording is extremely labor- and time-consuming.

DISCLOSURE OF THE INVENTION

It is therefore an object of the present invention to enable reservation recording to be set readily and speedily.

An information processing apparatus according to the present invention includes transmission means for transmitting a message asking a pre-set information furnishing apparatus for data for recording control and for receiving the data for recording control transmitted from the information furnishing apparatus, recording means for recording a pre-set picture and recording control means for controlling the recording of the recording means based on the data for recording control.

An information processing method according to the present invention includes a transmission step of transmitting a message asking a pre-set information furnishing apparatus for data for recording control and for receiving the data for recording control transmitted from the information furnishing apparatus, a recording step of recording a pre-set picture and a recording control step of controlling the recording of the recording step based on the data for recording control.

A medium for permitting a computer to execute a program, according to the present invention, includes a transmission step of transmitting a message asking a pre-set information furnishing apparatus for data for recording control and for receiving the data for recording control transmitted from the information furnishing apparatus, a recording step of recording a pre-set picture, and a recording control step of controlling the recording of the recording step based on the data for recording control.

Another information furnishing apparatus according to the present invention includes recording means for recording data for recording control, and communication means for receiving a message asking for the data for recording control from a pre-set information processing apparatus and for transmitting the data for recording control to the information processing apparatus.

Another information furnishing method according to the present invention includes a recording step of recording data for recording control and a communication step of receiving a message asking for the data for recording control from a pre-set information processing apparatus and for transmitting the data for recording control to the information processing apparatus.

Another medium for permitting a computer to execute a program according to the present invention includes a recording step of recording data for recording control and a communication step of receiving a message asking for the data for recording control from a pre-set information processing apparatus and for transmitting the data for recording control to the information processing apparatus.

A picture recording system according to the present invention includes an information processing apparatus for recording a pre-set picture and an information furnishing apparatus for furnishing data controlling the recording of the picture, in which the information processing apparatus includes transmission means for transmitting a message asking a pre-set information furnishing apparatus for data for recording control and for receiving the data for recording control transmitted from the information furnishing apparatus, recording means for recording a pre-set picture and recording control means for controlling the recording of the recording means based on the data for recording control, and in which the information furnishing apparatus includes recording means for recording data for recording control and communication means for receiving a message asking for the data for recording control from a pre-set information processing apparatus and for transmitting the data for recording control to the information processing apparatus.

Still another information processing apparatus according to the present invention includes connection setting means for setting the connection to a terminal, responsive tp a call from the terminal, over a communication network, communication means for transmitting data controlling a display function of the terminal to the terminal and for receiving data for recording control, transmitted from the terminal, recording means for recording a pre-set picture and recording control means for controlling the recording by the recording means based on the data for recording control.

Still another information processing method according to the present invention includes a connection setting step of setting the connection to a terminal, responsive tp a call from the terminal, over a communication network, a communication step of transmitting data controlling a display function of the terminal to the terminal and for receiving data for recording control, transmitted from the terminal, a recording step of recording a pre-set picture and a recording control step of controlling the recording by the recording means based on the data for recording control.

Still another medium for permitting a computer to execute a program, according to the present invention, includes a connection setting step of setting the connection to a terminal, responsive tp a call from the terminal, over a communication network, a communication step of transmitting data controlling a display function of the terminal to the terminal and for receiving data for recording control, transmitted from the terminal, a recording step of recording a pre-set picture and a recording control step of controlling the recording by the recording means based on the data for recording control.

BRIEF DESCRIPTION OF THE DRAWINGS

FIG. 13 illustrates a picture by a reservation recording setting program.

FIG. 14 illustrates another picture by a reservation recording setting program.

FIG. 15 illustrates a picture by a reservation recording setting program.

FIG. 16 illustrates a picture of a WWW browser.

FIG. 17 shows an example of recording reservation data.

FIG. 18 shows an example of a channel conversion file.

BEST MODE FOR CARRYING OUT THE INVENTION

Figure 1:
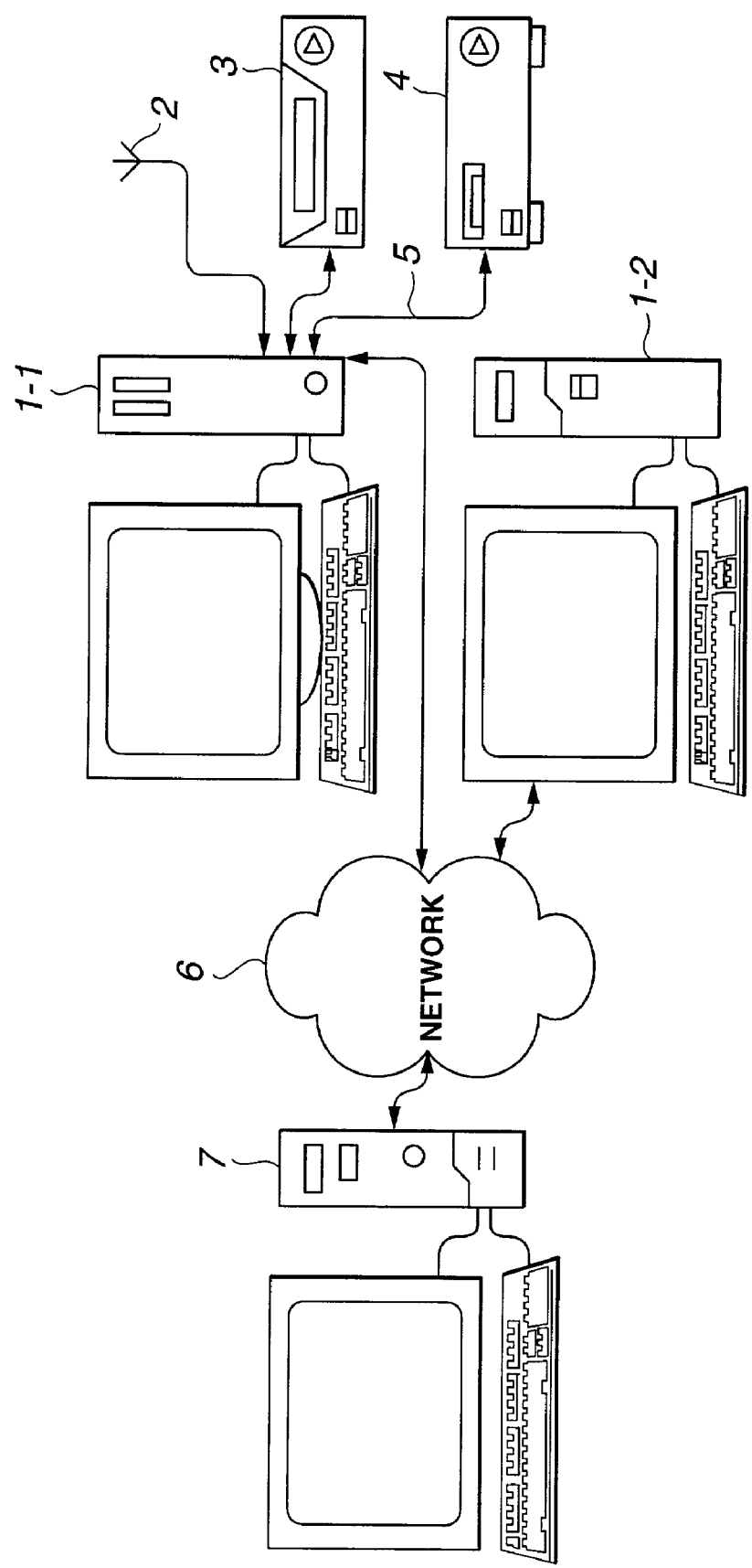
FIG. 1 shows an embodiment of a picture recording and/or reproducing system according to the present invention.

Referring to the drawings, the best mode for carrying out the present invention is explained in detail.

FIG. 1 shows an embodiment of a picture recording and/or reproducing system according to the present invention. A personal computer 1-1 is fed with signals supplied from an antenna 2, adapted for receiving electrical waves transmitted from a specified television broadcasting station, and reproduces a specified picture and speech, that is picture and speech of a so-called television program, while recording the picture and the speech. The personal computer 1-1 also reproduces the picture and the speech corresponding to analog signals supplied from VCR (video cassette recorder) 3 or digital data supplied from DVCR (digital video cassette recorder) 4, over a network 5, such as IEEE (Institute of Electrical and Electronic Engineers) 1394, while recording the picture and the speech.

The personal computer 1-1 sends analog signals corresponding to the recorded speech and picture to the VCR 3, or sends digital data corresponding to the recorded picture and speech to the DVCR 4.

The personal computer 1-1 transmits to the server 7 a message requesting transmission of data for recording reservation of a pre-set program of a pre-set television station, referred to below as recording reservation data, through a network 6, such as Ethernet or Internet, based on the procedure such as HTTP (Hypertext Transfer Protocol). The server 7 is a so-called Web server, adapted for receiving a message requesting transmission of recording reservation data for recording reservation of a pre-set program of a pre-set television broadcasting station, transmitted from the personal computer 1-1, referred to below as the recording reservation data, to transmit to the personal computer 1-1 data for reserved recording of the pre-set program of the pre-set television broadcasting station, associated with the message.

The personal computer 1-1 receives data for recording reservation of the pre-set program of the pre-set television broadcasting station, to execute reserved recording of the pre-set program based on the received data.

The personal computer 1-2 appends recording reservation data for recording reservation of the pre-set program of the pre-set television broadcasting station to an E-mail to send the resulting E-mail over the network 6 to the personal computer 1-1. The personal computer 1-1 receives the E-mail transmitted from the personal computer 1-2 to execute the reserved recording of the program by exploiting the recording reservation data attached to the E-mail.

Figure 2:
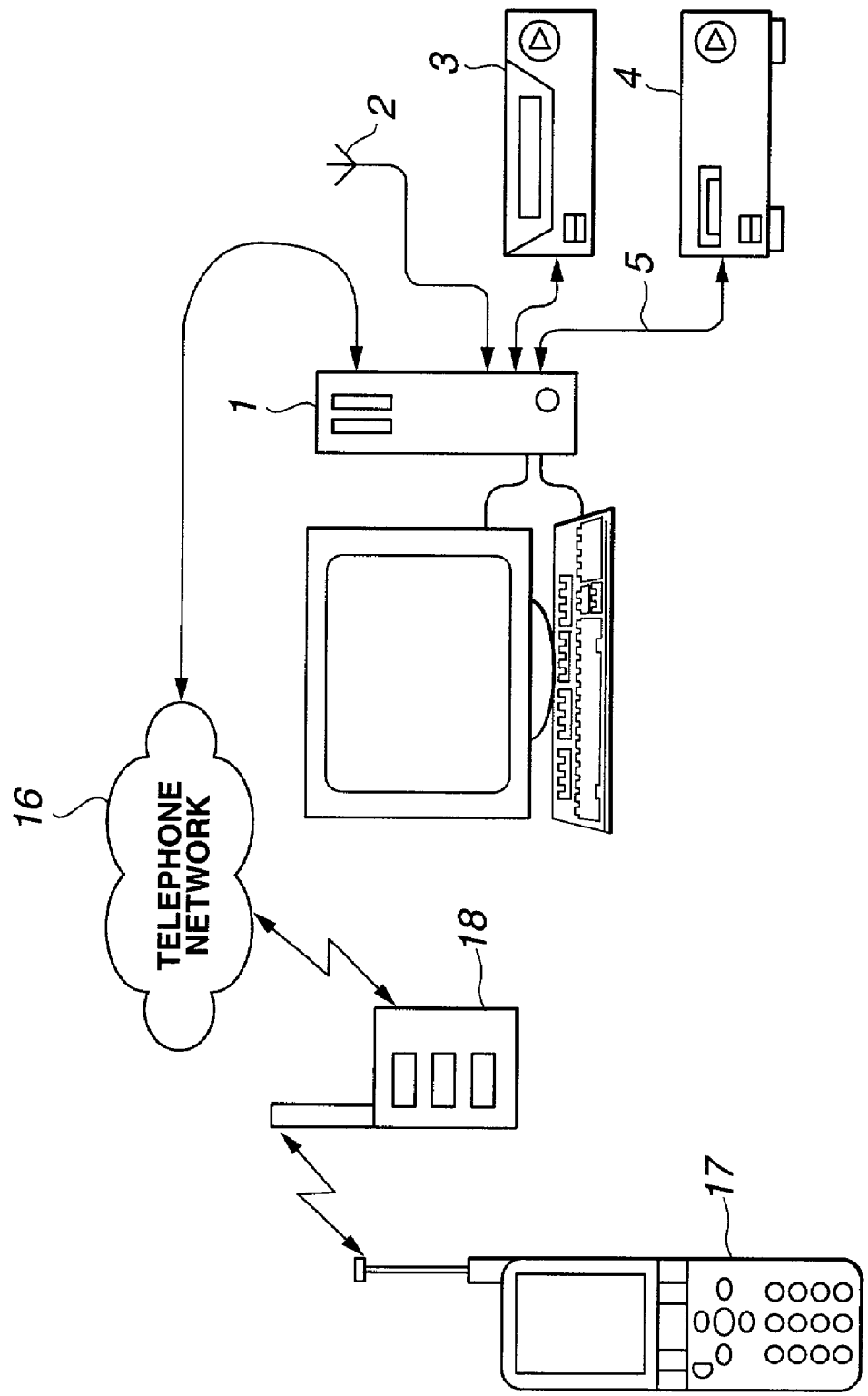
FIG. 2 shows an embodiment of a picture recording and/or reproducing system according to the present invention.

In FIG. 2, the personal computer 1 is connected to a portable telephone set 17, over a telephone network 16, in response to a call (dial call) from the portable telephone set 17 having a pre-set browser function. Based on a procedure, such as HTTP (Hypertext Transfer Protocol), the personal computer 1 transmits data for inputting data for reservation recording or selecting the setting for reservation recording to the portable telephone set 17 to receive data for reservation recording of a pre-set program of a pre-set television broadcasting station, referred to below as recording reservation data, to set reservation recording based on the received recording reservation data. The personal computer 1 executes reservation recording of a pre-set program based on the reservation recording setting.

The portable telephone set 17 has the function of a so-called browser such as i-mode (trademark) and invokes the personal computer 1 through a base station 18 and the telephone network 16 to display a pre-set text or figure based on data furnished from the personal computer 1. The user of the potable portable telephone set 17, who is also a user of the personal computer 1, inputs the setting for making reservation recording of a pre-set program of a pre-set television station, based on the pre-set text or figure demonstrated on the portable telephone set 17 by the browser function.

Based on the input setting for reservation recording the pre-set program of the pre-set television station, the portable telephone set 17 generates pre-set reservation recording data, in meeting with a pre-set processing operation, to transmit the recording reservation data to the personal computer 1 over the base station 18 and the telephone network 16.

Figure 3:
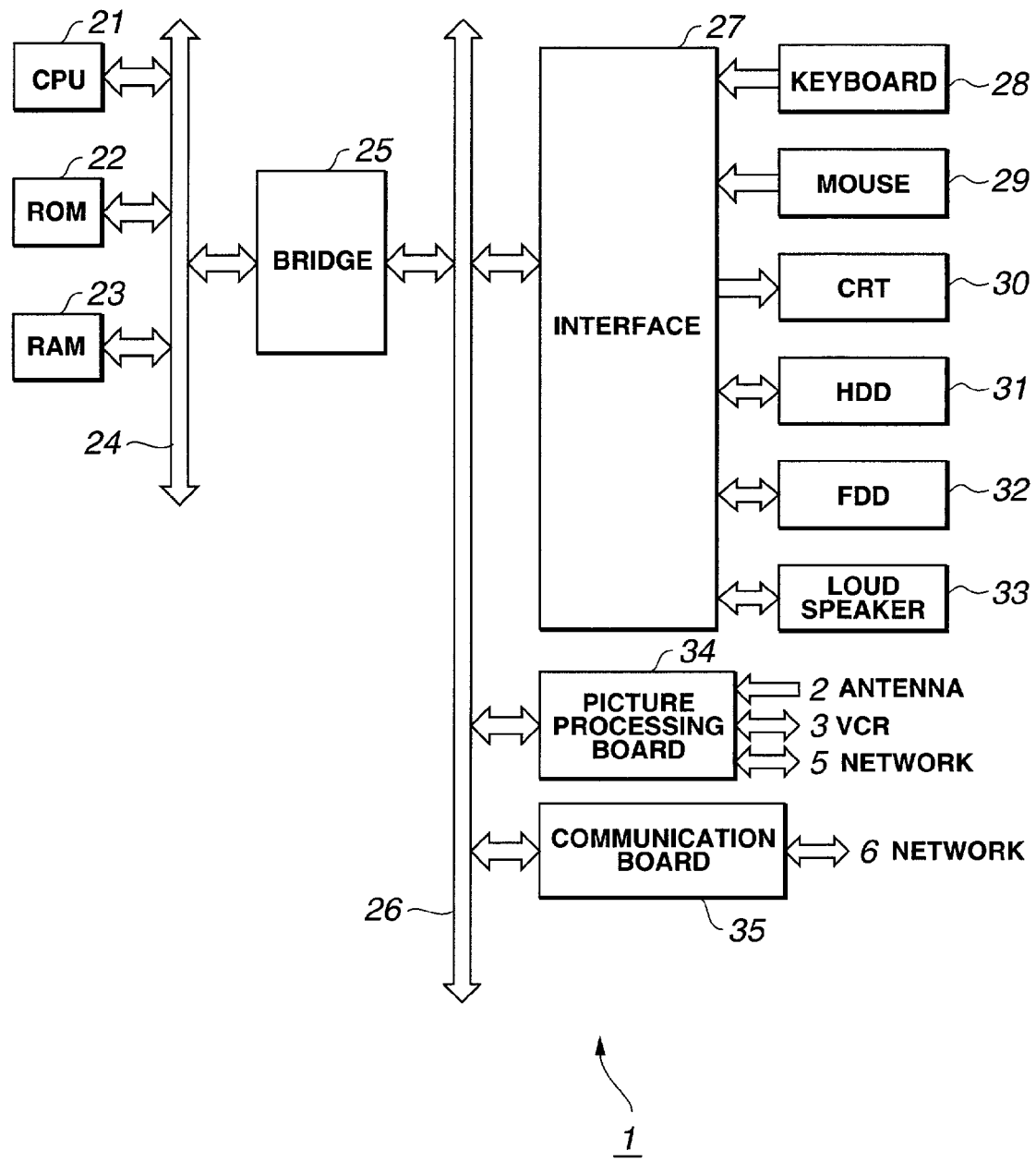
FIG. 3 is a block diagram showing the structure of a personal computer.

FIG. 3 is a block diagram for illustrating the structure of the personal computer 1. A CPU (central processing unit) 21 executes a variety of application programs or a basic operating system (OS). A read-only memory (ROM) 22 generally stores basic stationary data among parameters for arithmetic operations or programs used by the CPU 21. A RAM (random-access memory) 23 stores a program used by the CPU 21 in its operation and parameters incidentally changed as the program proceeds. These components are interconnected by a host bus 24 constructed by a CPU bus or a memory bus.

The host bus 24 is connected via a bridge 25 to an external bus 26, such as a PCI (peripheral component interconnect/interface) bus.

A keyboard 28 is acted upon by a user inputting various commands to the CPU 21. A mouse 29 is acted on by the user commanding or selecting a point on a screen of a cathode ray tube (CRT) 30 configured for demonstrating the various information by texts or images. An HDD (hard disc drive) 31 and an FDD (floppy disc drive) 32 actuate a hard disc and a floppy disc, respectively, to cause the hard disc or the floppy disc to record and/or reproduce the information or the program executed by the CPU 21. A loudspeaker 33 reproduces the specified speech. The above components from the keyboard 28 to the loudspeaker 33 are connected to an interface 27, which in turn is connected to the CPU 21 over the external bus 26, bridge 25 and the host bus 24.

A picture processing board 34 generates specified picture or speech data, based on signals supplied from an antenna 2, digital picture or speech data supplied from the DVCR 3, or picture or speech digital data supplied from the DVCR 4 or the DVCR 5, through the network 6-1, to output the generated data via the external bus 26 and the interface 27 to the HDD 31.

The picture processing board 34 is fed with picture or speech data, recorded on the HDD 31, through the external bus 26 and the interface 27, to generate analog signals corresponding to the input picture or speech data, to send the generated signals to the VCR 3. Alternatively, the picture processing board 34 generates digital data, corresponding to the input picture or speech data, to send the generated data over the network 5 to the DVCR 4.

The picture processing board 34 is connected over the external bus 26, bridge 25 and the host bus 24 to the CPU 21.

A communication board 35 is a device for connection to the network 6. In more detail, it is constituted by an Ethernet board etc. and is connected over the external bus 26, bridge 25 and the host bus 24 to the CPU 21.

Figure 4:
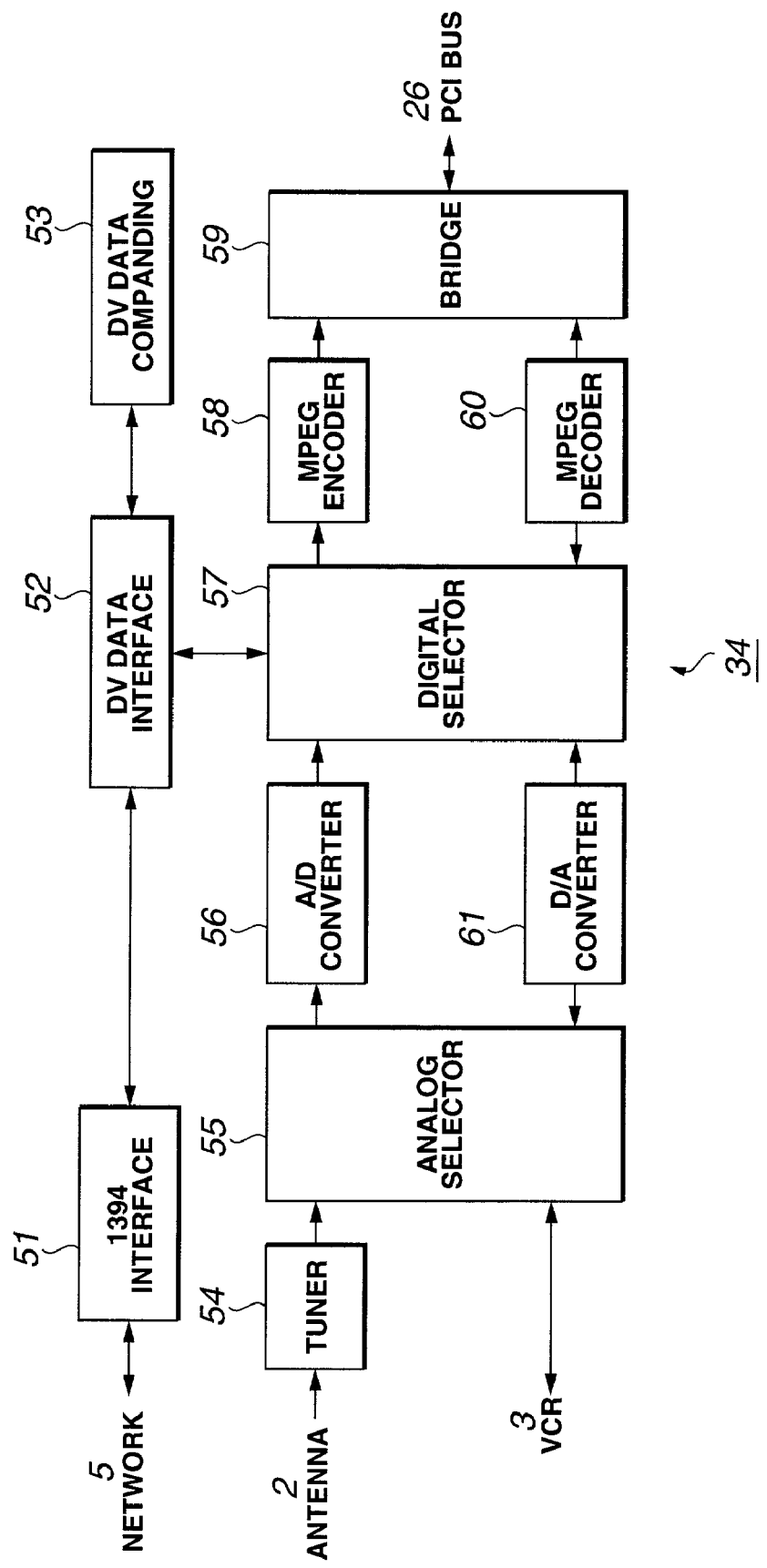
FIG. 4 shows the structure of a picture processing board.

The structure of the picture processing board 34 is now explained. FIG. 4 shows the structure of the picture processing board 34. The 1394 interface 51 is configured in meeting with the prescriptions of the IEEE 1394 and is connected to the network 5. The 1394 Interface 51 receives picture or speech digital data of the DVCR format, supplied from the DVCR 4 or the DVCR 5, based on the protocol consistent with the provisions of the IEEE 1394, to send the received data to a DV (Digital Video) data interface 52.

The 1394 interface 51 also sends picture or speech digital data of the DVCR format, routed from the DV data interface 52, to the DVCR 4, based on the protocol in meeting with the prescriptions of the IEEE 1394.

The DV data interface 52 outputs picture or speech digital data of the DVCR format, sent from the 1394 interface 51, and picture or speech digital data, routed from the digital selector 57, such as so-called non-compressed 4:1:1 digital data, to the DV data companding circuit 53, and also outputs the picture or speech digital data of the DVCR format supplied from the DV data companding circuit 53 to the 1394 interface 51, while outputting the non-compressed picture or speech digital data, supplied from the DV data companding circuit 53 and the digital selector 57, to the digital selector 57.

The DV data companding circuit 53 expands the picture or speech digital data of the DVCR format, supplied from the DV data interface 52, to non-compressed picture or speech digital data, to output the expanded digital data to the DV data interface 52. The DV data companding circuit 53 also compresses the non-compressed picture or speech digital data, supplied from the DV data interface 52, into picture or speech digital data of the DVCR format, to output the resulting compressed digital data to the DV data interface 52.

The tuner 54 is fed with RF (radio frequency) signals, fed from the antenna 2, to output picture or speech analog signals of a specified channel to the analog selector 52. The analog selector selects one of the picture or speech analog signals, sent from the tuner 54, VCR 3 or the D/V (digital/analog) conversion circuit 61, to output the selected signals to the A/D (analog/digital) conversion circuit 56 or the VCR 3.

The A/D conversion circuit 56 converts the picture and speech analog signals, sent from the analog selector 55, into digital data, such as so-called 4:1:1 picture data, to output the converted signals to the digital selector 57. The digital selector 57 is fed with picture and speech digital data output by the DV data interface 52, A/D conversion circuit 56 or the MPEG (Moving Picture Experts Group) decoder 60 to select one of the picture or speech digital data to output the selected data to the DV data interface 52, MPEG encoder 58 or D/A conversion circuit 61, and to a bridge 59.

The MPEG encoder 58 compresses the picture or speech digital data, sent from the digital selector 57, to digital data of the MPEG system, to output the resulting data to the bridge 59. The MPEG encoder 58 also converts a scene change picture into a still picture which is output to the bridge 59.

The bridge 59 outputs the non-compressed picture or speech digital data, supplied from the digital selector 57, to the CRT 30, through the PCI bus 26 of the personal computer 1, carrying the picture processing board 34, and through the interface 27. The bridge 59 outputs the picture or speech digital data of the MPEG system, sent from the MPEG encoder 58, through the PCI bus 26 of the personal computer 1 carrying the picture processing board 34 to the HDD 31 or to the CPU 21. The bridge 59 also receives the picture or speech digital data of the MPEG system from the HDD 31 of the personal computer 1 over the PCI bus 26 to output the received digital data to the MPEG decoder 60.

The MPEG decoder 60 expands the picture or speech digital data of the MPEG system, supplied from the bridge 59, into non-compressed picture or speech digital data, to output the expanded data to the digital selector 57.

The D/A conversion circuit 61 converts the picture or speech digital data, supplied from the digital selector 57, into analog signals, which are output to the analog selector 55.

Meanwhile, the processing corresponding to the MPEG encoder 58 or the MPEG decoder 60 may be executed by the CPU 21 in accordance with a specified program.

Figure 5:
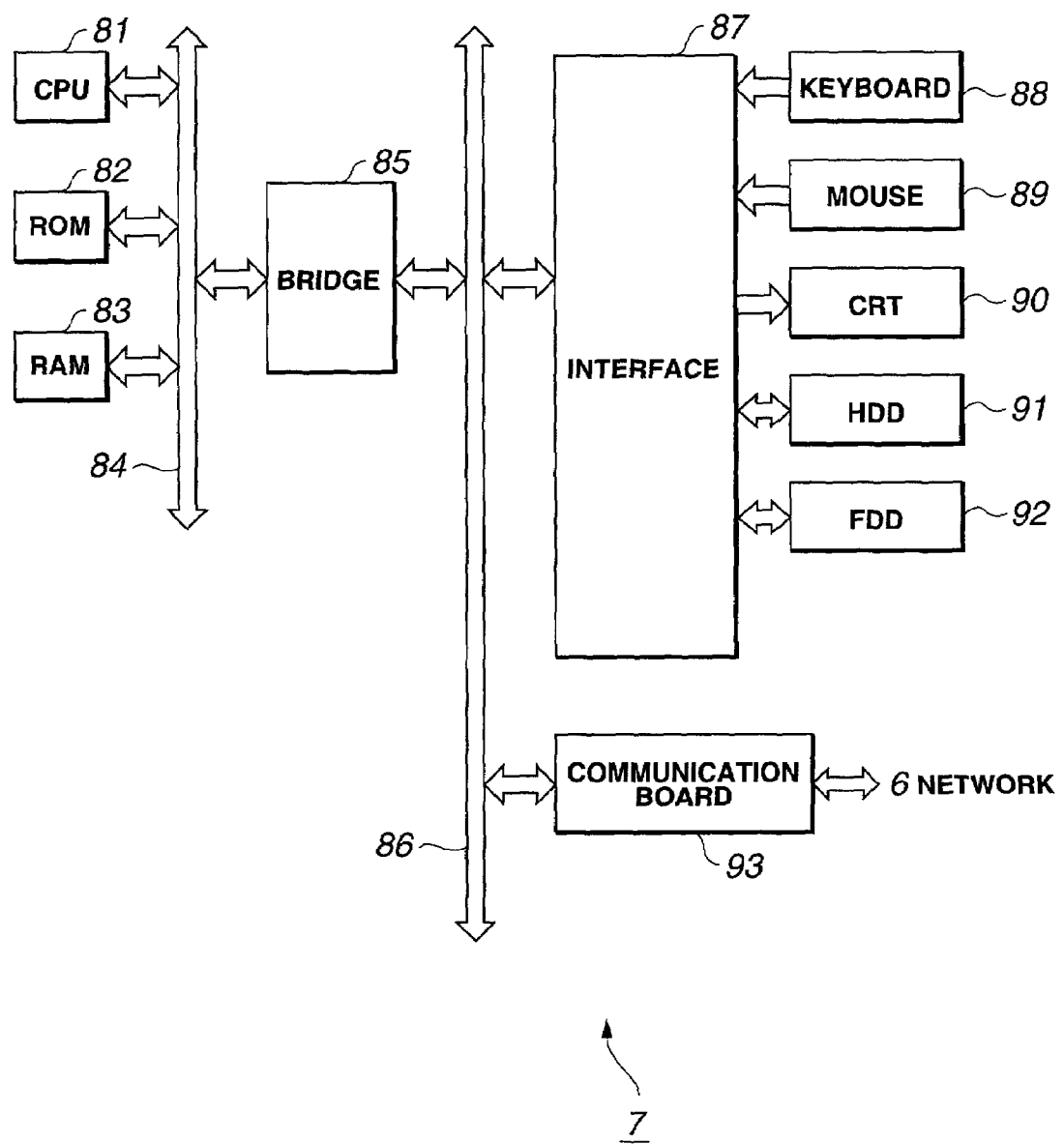
FIG. 5 illustrates the structure of a server.

FIG. 5 illustrates the structure of the server 7. The CPU 81 actually executes a variety of application programs or a basic OS. A ROM 82 stores basically fixed data among parameters for arithmetic operations and the program used by the CPU 81. The RAM 83 stores the program used in the execution of the CPU 81 or parameters incidentally changed during the program execution. These components are interconnected over a host bus 84 constituted by the CPU bus or the memory bus.

The host bus 84 is connected through the bridge 85 to an external bus 86, such as a PCI bus.

A keyboard 88 is acted upon by a user inputting various commands to the CPU 81. A mouse 89 is acted upon by the user making commands or selection of points on a screen of a CRT 90. The CRT demonstrates the various information by texts or images. An HDD 91 and an FDD 92 drive the hard disc or the floppy disc to cause the hard disc or the floppy disc to record and/or reproduce the information or the program executed by the CPU 81. These components from the keyboard 88 to the FDD 92 are connected to an interface 87, which in turn is connected to the CPU 71 through an external bus 86, a bridge 85 and a host bus 84.

A communication board 93 is a device for connection to the network 6, constructed by e.g., an Ethernet board, and is connected to the CPU 71 through the external bus 86, bridge 85 and the host bus 84 to the CPU 71.

The structure of the personal computer 1-2 is similar to that of the server 7 and hence is not explained here specifically.

Figure 6:
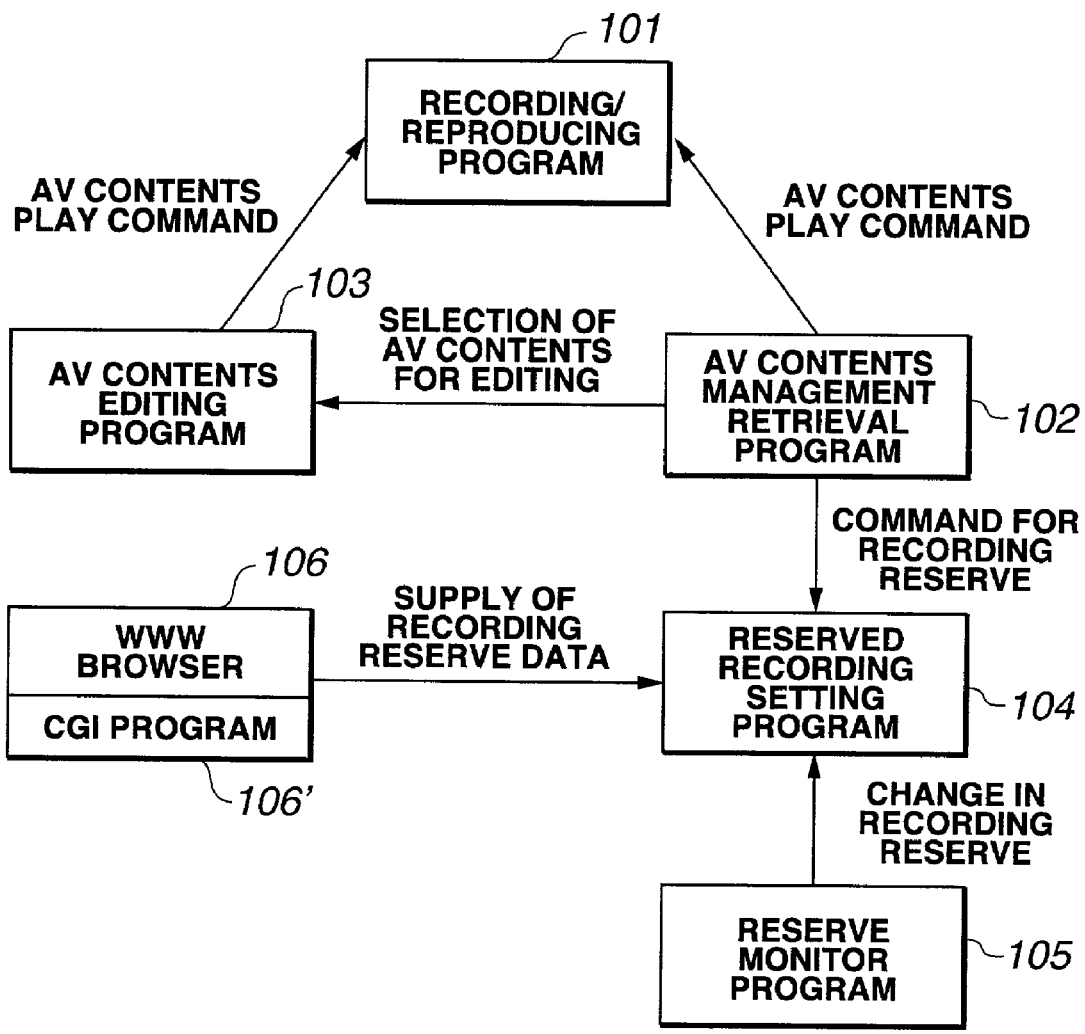
FIG. 6 illustrates an application program executed by the personal computer.

FIG. 6 illustrates an application program executed by the personal computer 1. A recording and/or reproducing program 101 causes the picture processing board 34 to select one of the picture or speech analog signals of a specified channel, as received by the tuner 54, picture or speech analog signals, sent from the VCR 3, and the picture or speech digital data sent over the network 5 from the DVCR 4. The recording and/or reproducing program 101 also converts the selected analog signals or digital data into picture or speech digital data of the MPEG system to record the resulting digital data in the HDD 31 as AV (audio visual) contents made up of one or more files of a pre-set format.

The recording and/or reproducing program 101 also causes the picture processing board 34 to expand the AV contents, recorded on the HDD 31 as one or more files of a predetermined format, to generate pre-set non-compressed picture or speech digital data to display the picture on the CRT 30 as well as to reproduce the speech by the loudspeaker 33.

An AV content management retrieval program 102 demonstrates the pre-set information, such as the date and time of recording or the AV contents recorded on the HDD 31. The AV content management retrieval program 102 also commands the recording and/or reproducing program 101 to reproduce the pre-set AV contents to select the AV contents as an object of editing to supply the information of the selected AV content information to an AV content editing program 103 to command reservation recording to an reservation recording setting program 104.

Based on the AV contents recorded on the HDD 31, the AV content editing program 103 edits the pre-set picture and speech of the selected AV contents, that is connects the picture and the speech contained in the pre-set AV contents, to generate AV contents of a pre-set form reproducing the edited picture or speech.

The AV contents are not provided with picture or speech digital data, and are constructed by the information specifying the AV contents as selected, the information exploiting the selected information and the information specifying the speech, and hence can be reproduced by the recording and/or reproducing program 101.

The reservation recording setting program 104 generates the AV contents executing the reservation recording, based on the setting. These AV contents are responsive to the setting (recording time and recording mode determining the picture quality) to secure the storage area for the HDD 31 at the outset. The reservation recording setting program 104 also generates the AV contents executing the reservation recording based on the recording reservation data furnished from the WWW (World Wide Web) browser 106 or an E-mail program, not shown.

A reservation monitoring program 105 is perpetually in operation (that is, resident) when the personal computer 1 is running (that is when the OS is running) to execute the reservation recording based on the AV contents for executing the reservation recording generated by the reservation recording setting program 104 and on the time supplied from an RTC (Real Time Clock). The reservation monitoring program 105 also changes the setting of the AV contents executing the reservation recording.

The WWW (World Wide Web) browser 106 requests the server 7 to transmit pre-set recording reservation data, in accordance with the pre-set procedure such as HTTP, and receives pre-set recording reservation data to send the received data to the reserved recording setting program 104.

A CGI program 106' transmits data displaying a specified menu, data for selecting the setting of the reservation recording or data indicating the state of reservation of the personal computer 1, to the portable telephone set 17, based on the specified procedure, such as HTTP, through a web server 125, in accordance with a program stated in a pre-set script. The CGI program 106' receives pre-set recording reservation data from the portable telephone set 17 to send the recording reservation data to the recording reservation setting program 104.

Figure 7:
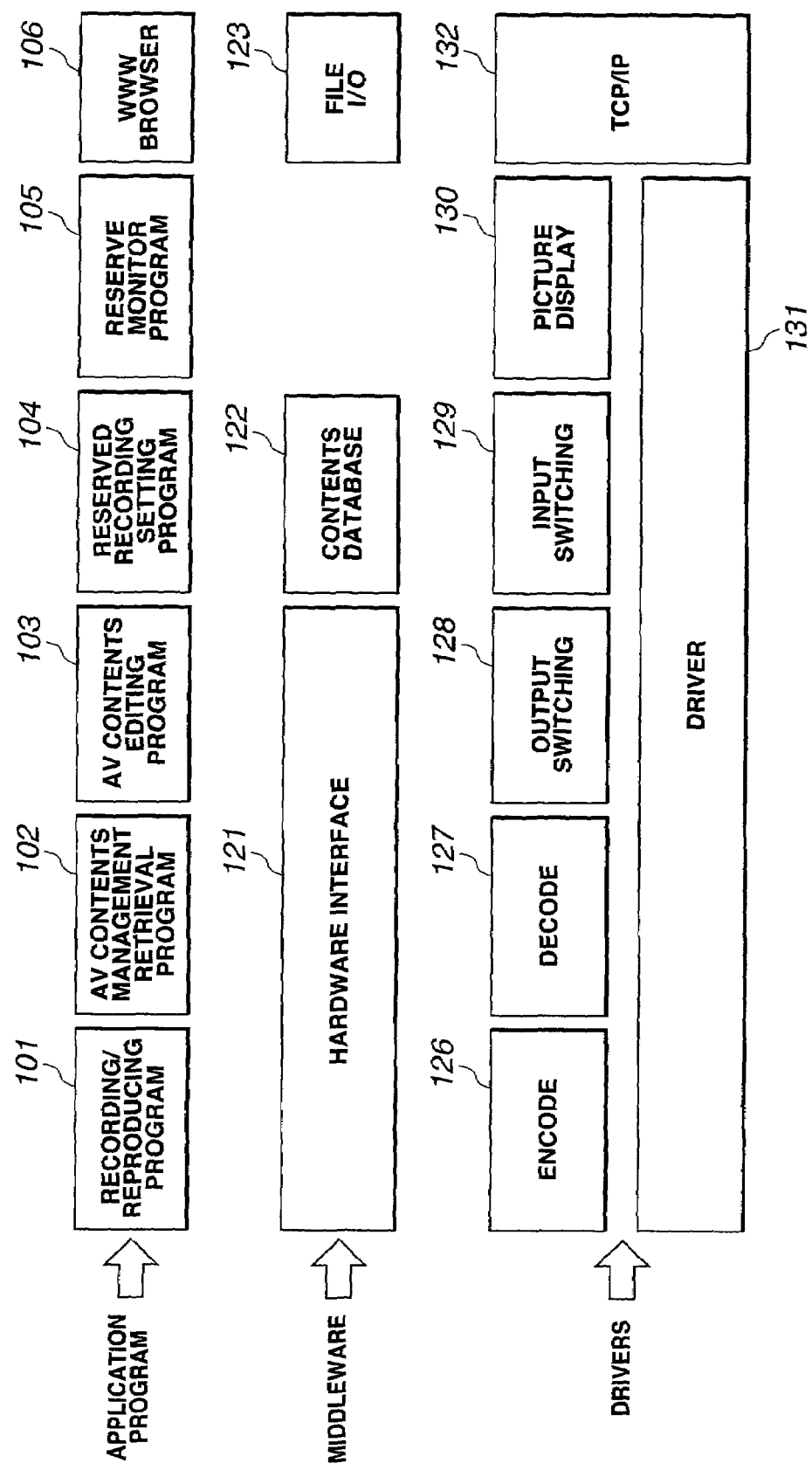
FIG. 7 illustrates the structure of an application program, a middleware and drivers executed by the personal computer.

FIG. 7 illustrates the structures of the application program executed by the personal computer 1, middleware and the drivers. The middleware is responsive to the request from the application program to actuate predetermined drivers. The drivers actually drive the pre-set resources of a hardware, such as MPEG encoder 58 of the picture processing board 34.

A hardware interface 121 arbitrates the use of hardware resources, as required by the recording and/or reproducing program 101, AV contents management retrieval program 102, AV contents editing program 103, recording reservation setting program 104 or the reservation monitoring program 105 to permit the application program to properly utilize specified hardware resources.

A content database 122 is such a database managing attribute data of the AV contents, as later explained, and which furnishes attribute data to the AV contents, as later explained, or data specifying the file memorizing digital picture or audio data corresponding to the AV contents, to the recording and/or reproducing program 101, AV contents management retrieval program 102, AV contents editing program 103, recording reservation setting program 104 or to the reservation monitoring program 105.

A file I/O (input/output) 123 deals with a readout or write request of specified AV contents made up of one or more files of the recording and/or reproducing program 101, AV contents management retrieval program 102, AV contents editing program 103, recording reservation setting program 104 or the reservation monitoring program 105 through the content database 122, and actually executes data readout or data writing for specified files.

An encoder 126 executes the control of causing the MPEG encoder 58 of the picture processing board 34 to compress the picture or speech data inputted from the digital selector 57 into digital data of the MPEG system.

A decoder 127 executes the control of causing the MPEG decoder 60 of the picture processing board 34 to expand the picture or speech digital data of the MPEG system inputted from the bridge 59.

An output switching unit 128 actuates an analog selector 55 and the 1394 interface 51 of the picture processing board 34 to control the outputting of the analog signals from the picture processing board 34 or of the digital data through the network s.

An input switching unit 129 actuates the analog selector 55, 1394 interface 51, DV data interface 52 and the digital selector 57 to select the analog or digital data inputted to the picture processing board 34.

A screen display 130 actuates the digital selector 57 and the bridge 59 etc to control display of a picture on the CRT 30.

A driver 131 deals with the requests from the encoder 126, decoder 127, output switching unit 128, input switching unit 129 and the screen display 130 to actually drive the picture processing board 34.

A TCP/IP 132 is a specified communication protocol and executes the processing of connecting the web server 125 to the portable telephone set 17.

Figure 8:
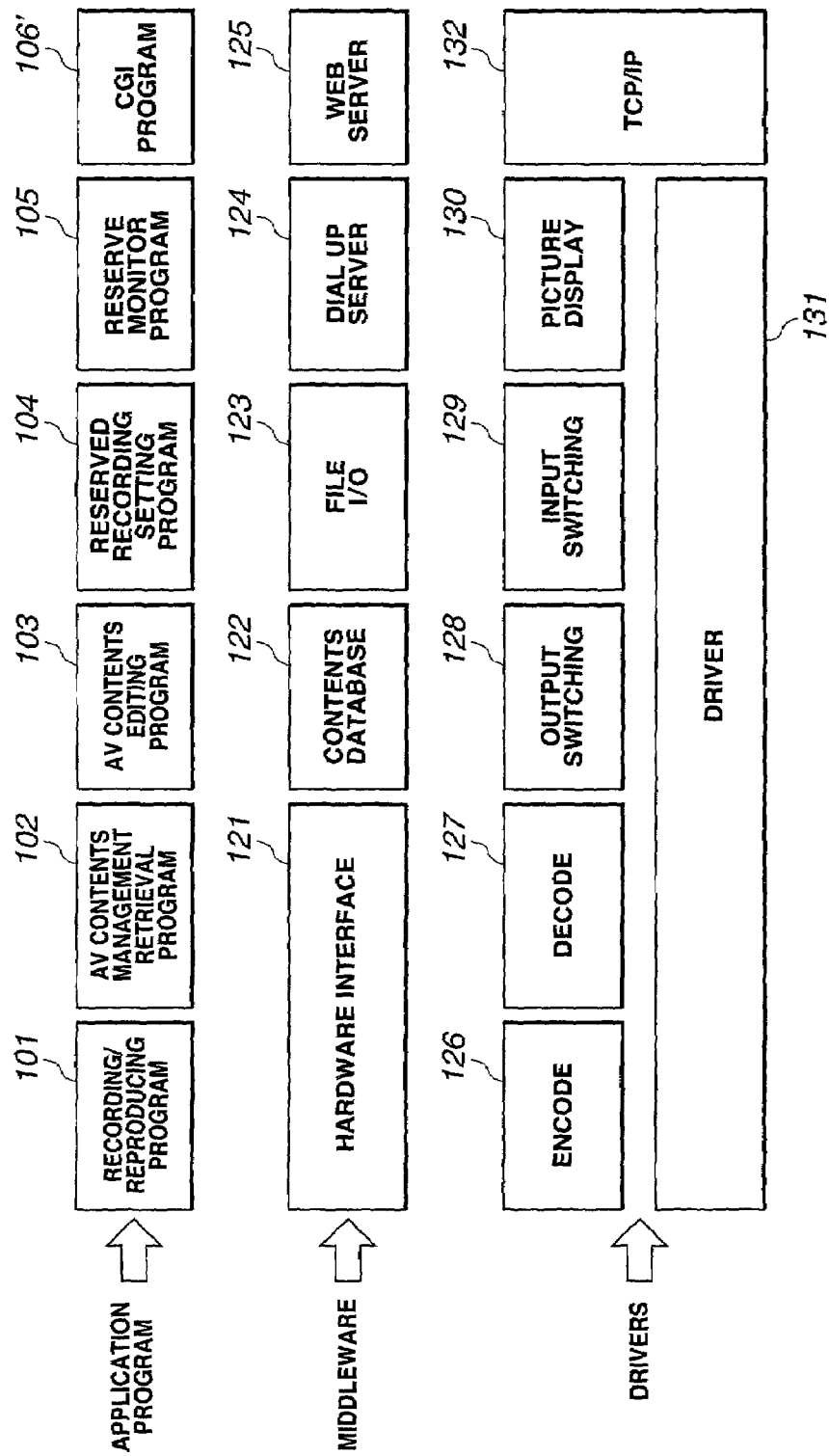
FIG. 8 illustrates the structure of an application program, a middleware and drivers executed by the personal computer.

FIG. 8 illustrates the structure of an application program, middleware and drivers executed by the personal computer 1. The middleware is responsive to a request to an application program to operate pre-set drivers. The drivers actually operate pre-set hardware resources, such as MPEG encoder 58 of the picture processing board 34.

A hardware interface 121 arbitrates the use of the hardware resources requested by the recording and/or reproducing program 101, AV content management retrieval program 102, AV content editing program 103, reservation recording setting program 104 or by the reservation monitoring program 105 to permit the application program to adequately exploit the pre-set hardware resources.

A content database 122 is such a database which manages attribute data of the AV contents, as later explained, and which furnishes data specifying a file memorizing the attribute data of the AV contents, as later explained, or data specifying the file memorizing the digital data of the picture or speech corresponding to the AV contents, to the recording and/or reproducing program 101, AV content management retrieval program 102, AV content editing program 103, reservation recording setting program 104 or to the reservation monitoring program 105.

A file I/O (input/output) 123 deals with a readout or write request for the pre-set AV contents of the recording and/or reproducing program 101, AV content management retrieval program 102, AV content editing program 103, reservation recording setting program 104 or the reservation monitoring program 105, made up of one or more files, through the content database 122, to execute data readout or writing for the pre-set files.

A dial-up server 124 deals with a call from the portable telephone set 17 to execute the processing of supplying a predetermined IP (Internet Protocol) address to the portable telephone set 17 through the telephone network 16, sets a communication path with the portable telephone set 17 and the personal computer 1 to permit data to be furnished to the portable telephone set 17. A web server 125 deals with the request received from the portable telephone set 17, based on the procedure such as HTTP, through a TCP (Transmission Control Protocol)/IP 132, or transmits data furnished from the CGI program 106 to the portable telephone set 17. The web server 125 furnishes the recording reservation data received from the portable telephone set 17 to the CGI program 106.

An encoder 126 performs control to cause the MPEG encoder 58 of the picture processing board 34 to compress data of the picture or speech input from the digital selector 57 into digital data of the MPEG system.

A decoder 127 performs control to cause the MPEG decoder 60 of the picture processing board 34 to expand the picture or speech digital data of the MPEG system input from the bridge 59.

An output switch 128 operates the analog selector 55 of the picture processing board 34 and the 1394 interface 51 to control the outputting of the analog signals from the picture processing board 34 and digital data through the network 5.

An input switch 129 operates the analog selector 55 of the picture processing board 34, 1394 interface 51, DV data interface 52 and the digital selector 57 to select the analog signals or the digital data sent to the picture processing board 34.

A picture display 130 operates the digital selector 57 and the bridge 59 etc to control the picture display on the CRT 30.

The drivers 131 deal with requests by the encoder 126, decoder 127, output switch 128, input switch 129 and the picture display 130 to actually operate the picture processing board 34.

The TCP 132 is a pre-set communication protocol and executes the processing for connecting the web server 125 to the potable telephone set 17.

In the following, explanation on the speech is omitted.

Figure 9:
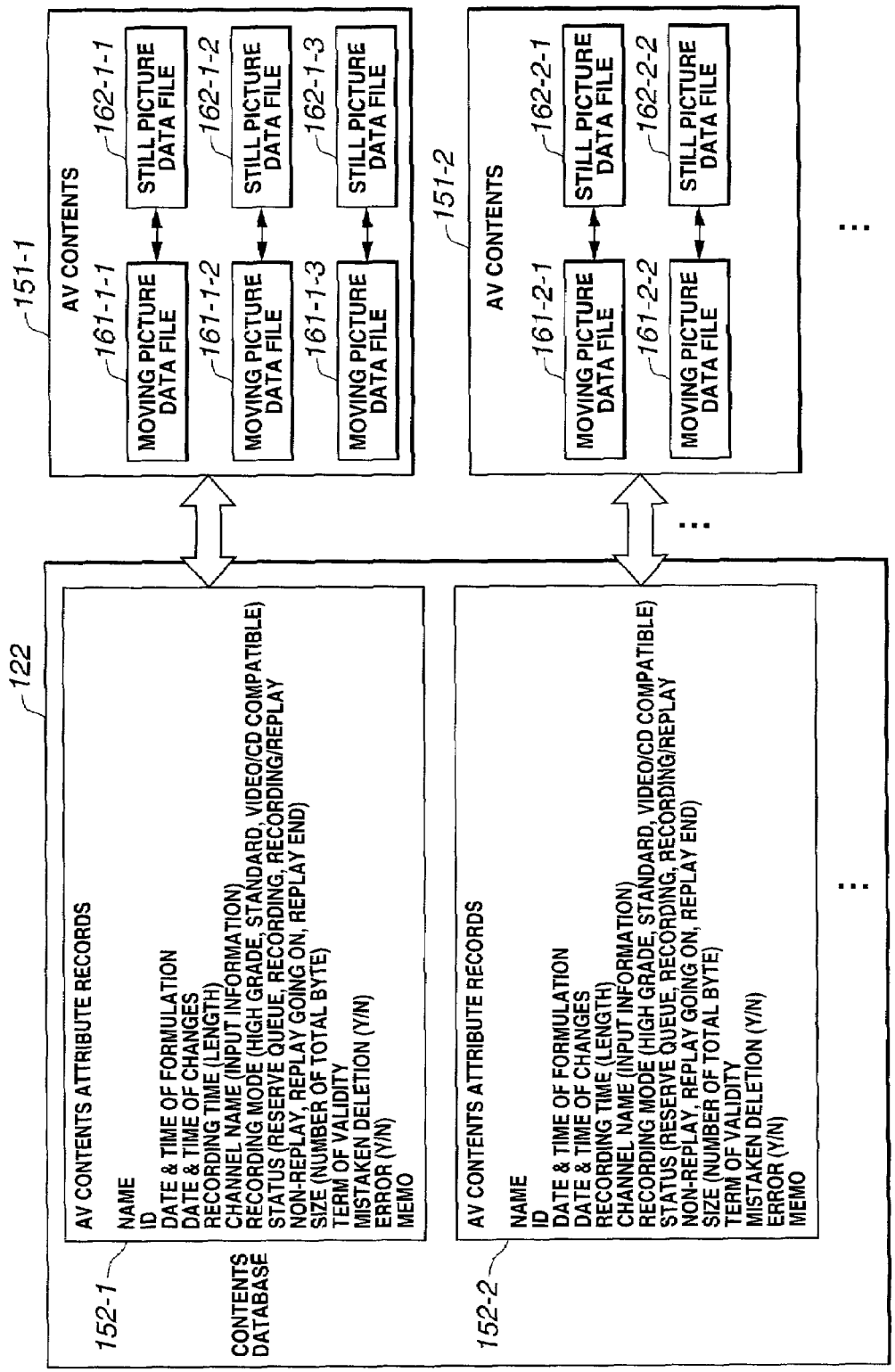
FIG. 9 shows an exemplary structure of AV contents.

FIG. 9 shows an illustrative structure of the AV contents. In the content database 122, recorded in the HDD 31, there are recorded attributes of the respective AV contents. In an AV content attribute record 152-1, recorded in the content database 122, there are stored data, such as name, ID (identification data), date and time of formulation, date and time of change, date and time of recording, channel name, recording mode, state, term of validity, shown by date and time, setting of the mistaken deletion, presence or absence of errors, two-dimensional bar code and memo, as attributes of the AV contents 151-1. In an AV content attribute record 152-2, recorded in the content database 122, there are stored data, such as name, ID, date and time of formulation, date and time of change, date and time of recording, channel name, recording mode, state, term of validity, setting of the mistaken deletion, presence or absence of errors and memo, as attributes of the AV contents 151-2.

The recording mode data stored in the AV content attribute record 152-1 indicate that the moving picture data files 161-1-1 to 161-1-3 are one of high quality, standard and video CD compatible, which video CD compatible specifies that the picture data are of the MPEG-1 system. On the other hand, the status data stored in the AV content attribute record 152-1 indicate that the AV content attribute record 151-1 is in an reservation queue, in recording state, in the recording and/or reproducing state, that is in the state of recording data and reproducing recorded picture data, in the non-reproducing state, in the reproducing state or in the replay end state.

The error indicates the states of the AV content attribute record 151-1, such as the personal computer 1 malfunctioning during recording, recording aborted partway, recording state during recording being bad such that input signals from the antenna 2 are not reproduced, or partial dropout of the moving picture file 161-1-1.

As for the setting of the term of validity and the setting for inadvertent deletion, neither one is set, or one of them is set, while it does not occur that both are set simultaneously.

The recording mode data stored in the AV content attribute record 152-2 indicate that the moving picture data files 161-2-1 to 161-2-3 are one of high quality, standard and video CD compatible. On the other hand, the status data stored in the AV content attribute record 152-2 indicate that the AV content attribute record 151-2 is in the reservation queue, in recording state, in the recording and/or reproducing state, in the non-reproducing state, in the reproducing state or in the replay end state.

The AV content attribute record 151-1 is made up of moving picture data files 161-1-1 to 161-1-3, recorded on the HDD 31, and of moving picture data files 162-1-1 to 162-1-3, recorded on the HDD 31. In the moving picture data files 161-1-1 to 161-1-3, there are stored picture data of the MPEG system. The picture corresponding to the picture data stored in the leading end of the moving picture data file 161-1-2 is consecutive to a picture corresponding to picture data stored in the trailing end of the moving picture data file 161-1-1. Similarly, the picture corresponding to the picture data stored in the leading end of the moving picture data file 161-1-3 is consecutive to a picture corresponding to picture data stored in the trailing end of the moving picture data file 161-1-2.

In a still picture data file 162-1-1, picture data corresponding to a still picture converted from a scene change picture of picture data stored in the moving picture data file 161-1-1 and data on the scene change time are stored. In a still picture data file 162-1-2, picture data corresponding to a still picture converted from a scene change picture of picture data stored in the moving picture data file 161-1-2 and data on the scene change time are stored. In a still picture data file 162-1-3, picture data corresponding to a still picture converted from a scene change picture of picture data stored in the moving picture data file 161-1-3 and data on the scene change time are stored.

The AV contents 151-2 are made up of the moving picture data files 161-2-1 to 161-2-2 and still picture data files 162-2-1 and 162-2-2, and are similar to the AV contents 151-1. Therefore, the AV contents 151-2 are not explained specifically.

If there is no necessity of demarcating the AV contents 151-1 and the AV contents 151-2 from each other, these are simply termed an AV contents 151. If there is no necessity of demarcating the AV contents attribute record 152-1 and the AV contents attribute record 152-2 from each other, these are simply termed an AV contents attribute record 152. If there is no necessity of demarcating the moving picture data files 161-1-1 to 161-1-3 from one another, or if there is no necessity of demarcating the moving picture data files 161-2-1 or 161-2-2 from each other, these are also termed a moving picture data file 161. In addition, if there is no necessity of demarcating the still picture data files 162-1-1 to 162-1-3 or the still picture data files 162-2-1 or 162-2-2 from one another, these are simply termed a still picture data file 162.

Figure 10:
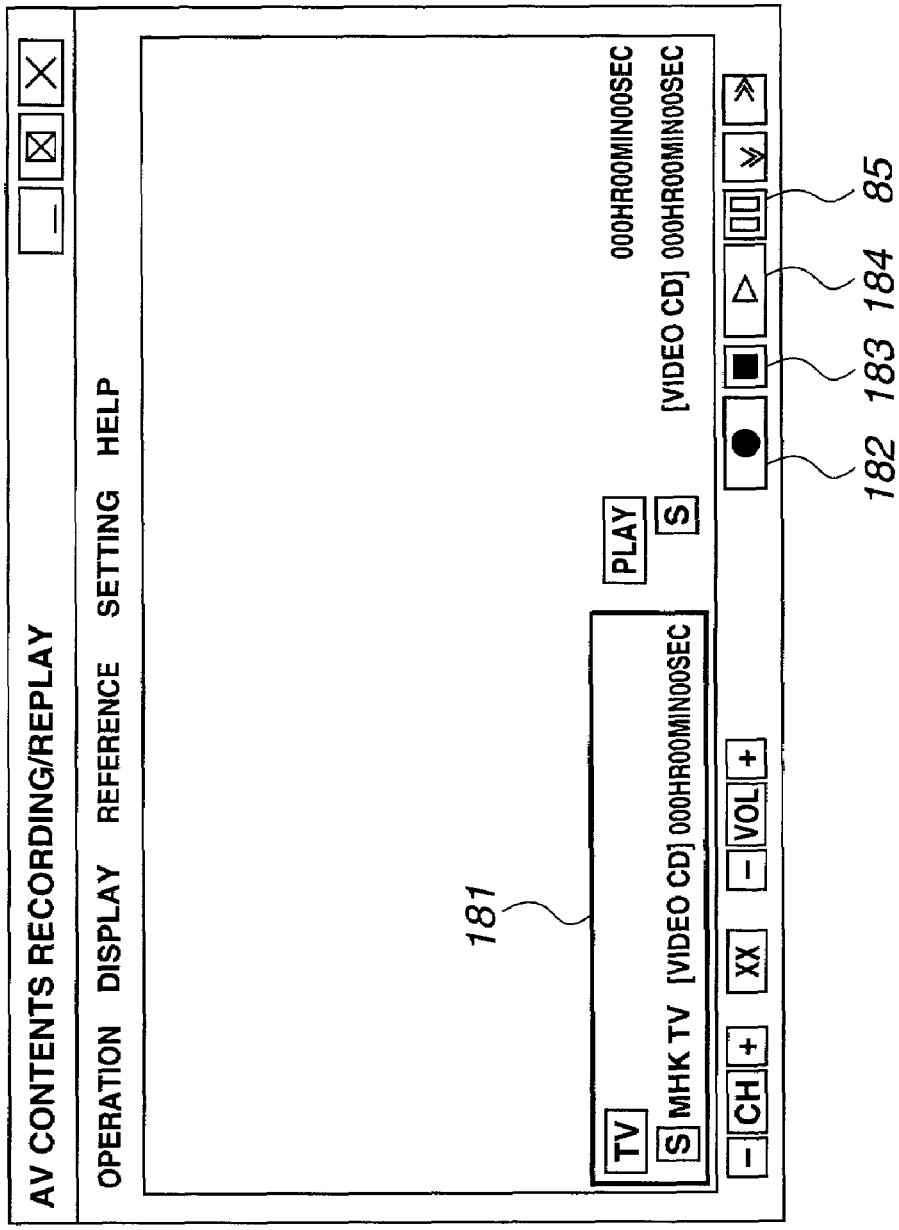
FIG. 10 illustrates a picture displayed on a CRT of a personal computer when the recording and/or reproducing program permits recording processing.

The picture the recording and/or reproducing program 101 displayed on the CRT 30 of the personal computer 1 is hereinafter explained. FIG. 10 shows a picture displayed on the CRT 30 of the personal computer 1 when the picture recording operation is possible.

In a picture recording window 181 are set a channel for recording, a recording mode etc. When the picture recording is started, the recording and/or reproducing program 101 sets the operation of the tuner 54 of the picture processing board 34 or the MPEG encoder 58 of the picture processing board 34, based on the setting of the picture recording window 181, to generate pre-set AV contents 151 and the AV contents attribute record 152 for recording on the HDD 31.

When the picture recording window 181 is selected and active, a picture recording button 182 and a recording stop button 183 are both active to enable the operation. That is, if the picture recording window 181 is selected and active, the recording and/or reproducing program 101 starts and halts picture recording when a recording button 182 is clicked and a stop button 183 is clicked, respectively.

If the picture recording window 181 is selected and active, a playback button 184 and a pause button 185 are non-active, such that the recording and/or reproducing program 101 is not in operation even when the playback button 184 or the pause button 185 is clicked, respectively.

Figure 11:
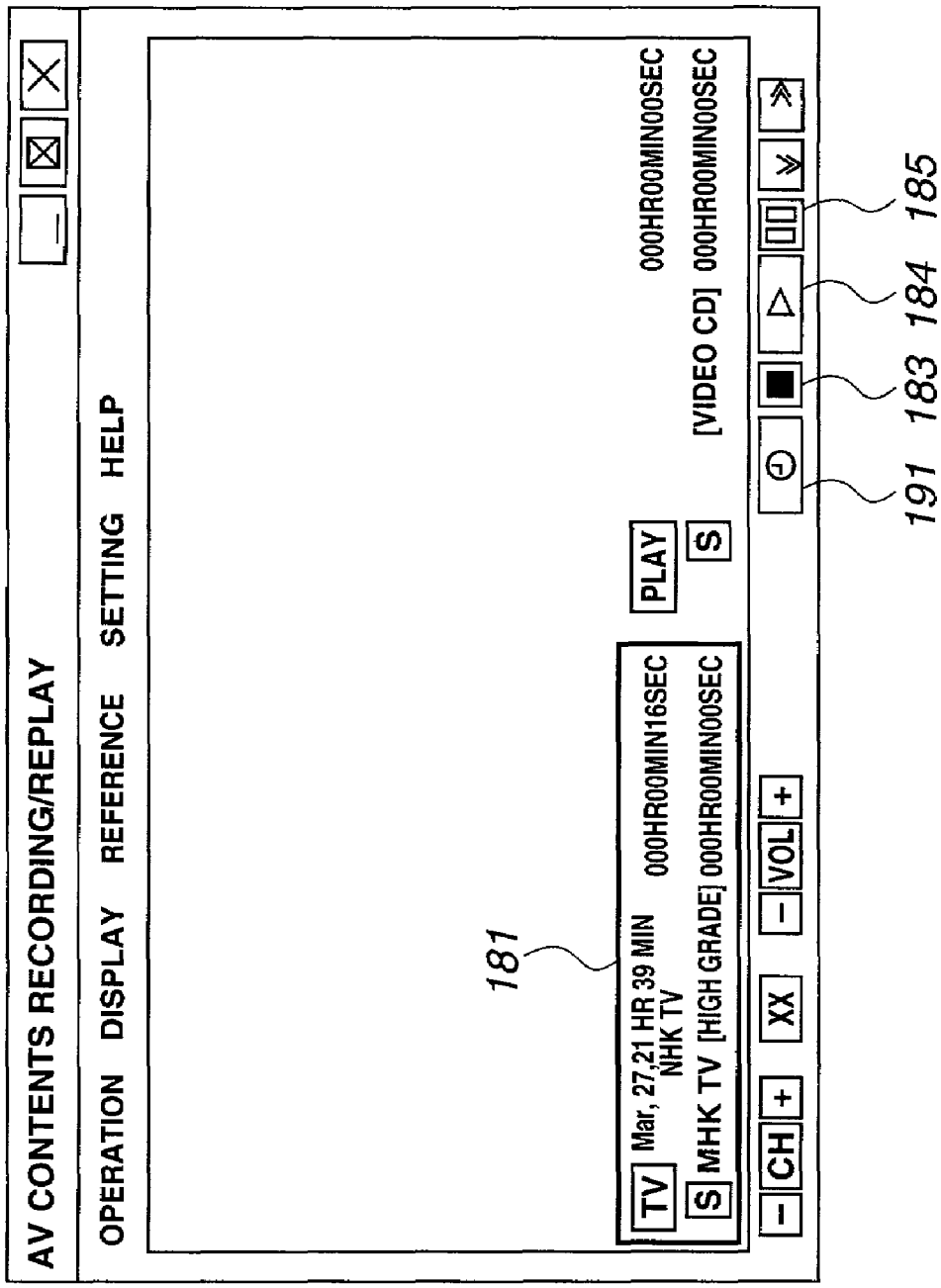
FIG. 11 illustrates a picture displayed on the CRT pf the personal computer when the recording and/or reproducing program has started the recording.

FIG. 11 illustrates a picture displayed on the CRT 30 of the personal computer 1 when the recording and/or reproducing program 101 has started picture recording. The picture recording window 181 displays the time elapsed as from start of picture recording and the current time in addition to the recording channel and the recording mode.

When the recording is started, the recording button 182 is changed to a recording time change button 191. The recording time is changed whenever the recording time change button 191 is clicked.

Figure 12:
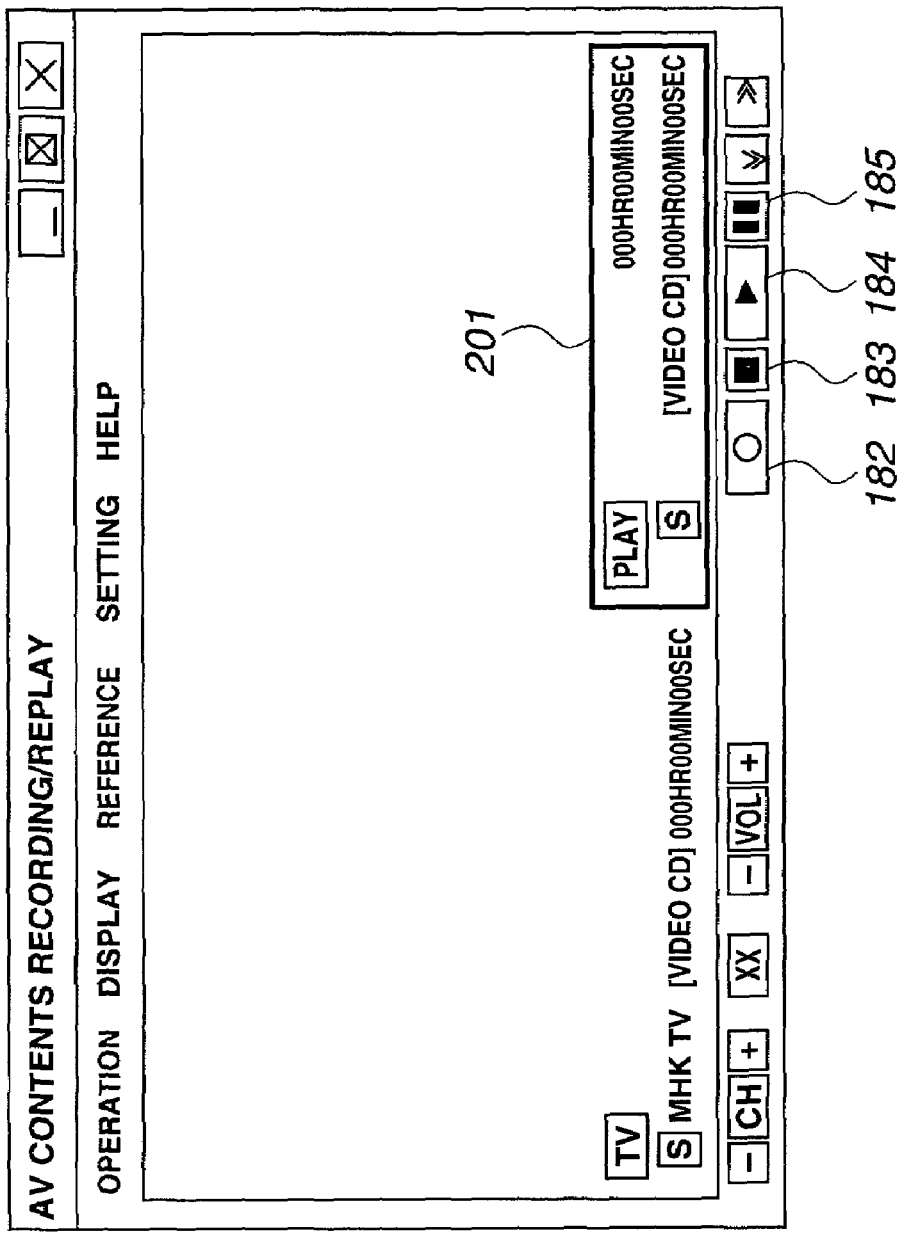
FIG. 12 illustrates a picture displayed on a CRT of a personal computer when the recording and/or reproducing program permits reproducing processing.

A picture displayed when a specified AV contents 151 or AV contents 121 are reproduced by the recording and/or reproducing program 101 is explained. FIG. 12 illustrates a picture displayed on the CRT 30 of the personal computer 1 when the recording and/or reproducing program 101 is able to perform a reproducing operation.

In a playback window 201 is displayed e.g., a picture recording mode of the AV contents to be reproduced. When the playback window 201 is selected and active, the stop button 183, playback button 184 and the pause button 185 are active to enable the operation. That is, when the playback window 201 is selected and active, the recording and/or reproducing program 101 starts, transiently stops and ultimately stops the reproduction when it is the reproducing button 184, pause button 185 and the stop button 183 that has been clicked, respectively.

On the other hand, if the playback window 201 is selected and active, the picture recording button 182 is non-active, such that the recording and/or reproducing program 101 is not in operation even when the recording button 182 is clicked.

Since the recording and/or reproducing program 101 is responsive to selection of the picture recording window 181 or the playback window 201 to change the recording button 182, stop button 183, reproducing button 184 or the pause button 185 to an active or non-active state, the user is able to know the possible contents of operation reliably and hence is able to operate speedily to prevent inadvertent operation.

The picture recording reservation is hereinafter explained. FIGS. 13 to 15 illustrate a picture displayed on the CRT 30 on startup of the reservation recording setting program 104. On startup, the reservation recording setting program 104 first demonstrates a window setting a channel for recording and date and time for start of picture recording, as shown in FIG. 13. The user sets the channel for recording and date and time for start of picture recording in each pre-set file of the window. In the illustrated embodiment, hour and minute are set in respective different fields.

If, after setting the channel for recording and date and time for start of picture recording, a specified button, a button labelled "next" in the illustrated embodiment, is clicked, the reservation recording setting program 104 reads the channel for recording and data on the date and time of start of recording, as set in a specified field, to change the window to a window setting the end time and the recording mode shown in FIG. 14.

The reservation recording setting program 104 displays the channel as set for recording and data on the recording start date and time, in a window used for setting the end time and the recording mode, while displaying the end time and the recording mode in the respective fields. It is noted that hours and minutes are set in respective different fields.

When the end time and the recording mode are set in this window, the reservation recording setting program 104 displays data usable as index for setting, such as using amount of the HDD 31. If the end time and the recording mode are set and a pre-set button, herein the button labelled "next", is clicked, the reservation recording setting program 104 reads-in the data of the end time and the recording mode, as set in pre-set fields, to change the window to a window for confirming the setting shown in FIG. 15.

The reservation recording setting program 104 displays data, such as the channel for recording, time and date of start of recording, time and date of end of recording and the recording mode, in the window used for confirming the setting. If the pre-set button, herein a button labelled "end", is clicked, the reservation recording setting program 104 causes the AV contents 151, executing the reservation recording, to be recorded on the HDD 31, to register the AV contents attribute record 152 corresponding to the recorded AV contents 151 in the content database 122.

The AV contents 151, executing the reservation recording, has, from the outset, a moving picture data file 161, including a recording area associated with the recording time and the recording mode. If, for example, the quantity of data of a picture per second in a standard mode is 5 Mbits, the reservation recording setting program 104, set for recording for four hours in the standard mode, generates one or more moving picture data files 161, having a sum total of 9 Gbytes, in the HDD 31, in accordance with the following equation:

14400 sec*(5 M bits/sec)/(8 bits/byte)=9 G bytes since four hours is equal to 14400 seconds.

The operation of the reservation recording setting program 104 generating the AV contents 151, designed for executing the reserved recording based on the pre-set recording reservation data downloaded from the server 7, is now explained. If the user boots the WWW browser 106, the personal computer 1-1 causes a pre-set picture to be displayed, based on the pre-set file stated in HTML (Hypertext Markup Language) furnished from the server 7 over the network 6.

FIG. 16 shows a picture the personal computer 1-1 running the WWW browser 106 demonstrates on the CRT 30, based on a pre-set file supplied from the server 7. The personal computer 1-1 demonstrates the so-called program table. In this program table, there are arrayed pre-set recording reservation data download buttons 251-1 to 251-11 in association with the respective programs.

If, for example, the reservation data download button 251-1 is clicked, the recording reservation data for reservation recording of the "news at 7 o'clock" of NHK General is downloaded to the personal computer 1-1. If the reservation data download button 251-2 is clicked, the recording reservation data for reservation recording of the "TV map" of NHK General is downloaded to the personal computer 1-1. If the reservation data download button 251-3 is clicked, the recording reservation data for reservation recording of the "drama" of NHK General is downloaded to the personal computer 1-1. If the reservation data download button 251-4 is clicked, the recording reservation data for reservation recording of the "local weather" of NHK General is downloaded to the personal computer 1-1.

If the reservation data download button 251-5 is clicked, the recording reservation data for reservation recording of the "After School Club" of NHK Educational is downloaded to the personal computer 1-1. If the reservation data download button 251-6 is clicked, the recording reservation data for reservation recording of the "Dactylologic Corner" of NHK Educational is downloaded to the personal computer 1-1. If the reservation data download button 251-7 is clicked, the recording reservation data for reservation recording of the "Health for Tomorrow" of NHK Educational is downloaded to the personal computer 1-1. If the reservation data download button 251-6 is clicked, the recording reservation data for reservation recording of the "Dactylologic Corner" of NHK Educational is downloaded to the personal computer 1-1. If the reservation data download button 251-7 is clicked, the recording reservation data for reservation recording of the "Health for Tomorrow" of NHK Educational is downloaded to the personal computer 1-1.

If the reservation data download button 251-8 is clicked, the recording reservation data for reservation recording of the "Tonight With You" of NHK Educational is downloaded to the personal computer 1-1. If the reservation data download button 251-9 is clicked, the recording reservation data for reservation recording of the "Lets Learn Braille" of NHK Educational is downloaded to the personal computer 1-1.

If the reservation data download button 251-10 is clicked, the recording reservation data for reservation recording of the "Processing-Baseball" of Nippon TV is downloaded to the personal computer 1-1. If the reservation data download button 251-11 is clicked, the recording reservation data for reservation recording of the "Friday TV of Sun 1" of TBS is downloaded to the personal computer 1-1.

Since the recording reservation data includes data necessary for recording reservation explained with reference to FIGS. 13 to 15, except the recording mode, the personal computer 1-1 is able to record the AV contents of executing the reserved recording in the HDD 31, even in the absence of setting by the user, if the recording mode is previously set, and if the recording reservation data downloaded on actuating the recording reservation data downloading button s 251-1 to 251-11 is used.

FIG. 17 shows an example of recording reservation data constituted by text data.

The "Content-type: application/x-tv-program-info; charset_jis", stated on line 1 of the recording reservation data, indicates that this data is the recording reservation data. In line 3 of the recording reservation data is stated, next to "station:", data for specifying a channel for recording. For example, in "station: Nippon TV" of FIG. 17, data for specifying the channel for recording is "Nippon TV".

The data for specifying the channel for recording is converted into data specifying a pre-set channel (broadcasting station) by a processing in which the ambiguous description in a pre-set range is allowed and which exploits the channel conversion file shown in FIG. 18.

For example, in a character sequence of the channel conversion file "4, 0, 0, 4, Nippon Television, Nippon TV, Nittele, Nippon TV Broadcasting Network, NTV", the first numerical figure from left "4" is data specifying the channel, the numerical figure "4" to the right of the third comma from left is channel representing data and the letter sequence to the right of the fifth comma from left, divided by commas, that is "Nippon TV", "Nittele", "Nippon TV Broadcasting Network" and "NTV" denote letter sequences for matching to the pre-set letter sequence of the channel conversion file.

For example, if line 3 of the recording reservation data states: "station: Nippon TV", the reservation recording setting program 104 checks whether or not the letter string "Nippon TV" next to "station" is in agreement with the letter string next to the fifth comma from left in the channel conversion file.

If the letter sequence "4, 0, 0, 4, Nippon Television, Nippon TV, Nittele, Nippon TV Broadcasting Network, NTV" is included in the channel conversion file, as shown in the embodiment of FIG. 18, the reservation recording setting program 104 verifies that the letter sequence "Nippon TV" (lying to the right of the fifth comma from left) is matched to the letter sequence of the channel conversion file.

If the letter sequence of the recording reservation data is matched to that of the channel conversion file, the reservation recording setting program 104 sets the data specifying the matched channel of the same line of the channel conversion file as a channel.

For example, if the letter sequence "4, 0, 0, 4, Nippon Television, Nippon TV, Nittele, Nippon TV Broadcasting Network, NTV" is matched to the letter sequence of the recording reservation data, the channel 4 is set.

So, if the letter sequence for specifying the channel in the recording reservation data is one of "Nippon Television, Nippon TV, Nittele, Nippon TV Broadcasting Network, NTV", the remote controller 4 can set the channel 4 based on the recording reservation data.

So, even if the letter sequence specifying the channel of the recording reservation data is ambiguous to more or less extent, the remote controller 4 can set the pre-set channel based on the recording reservation data.

There is stated, on lines 4 to 7 of the recording reservation data, data for specifying the date and time of starting the recording, whereas, on line 8 thereof, there is stated data specifying the recording end time.

The recording reservation data not only can be downloaded from the server 7, but also can be appended to an E-mail for transmission to the personal computer 1-1. Since the recording reservation data is constituted by letter string data, the user of the personal computer 1-2 is able to prepare the recording reservation data easily using e.g., a ubiquitous application program, such as a word processor or a text editor.

Figure 19:
FIG. 19 illustrates a picture displaying data of an E-mail, having recording reservation data appended thereto, by an E-mail program.

If the personal computer 1-1 on receipt of the E-mail displays E-mail data by a pre-set E-mail program, the E-mail program demonstrates an icon 281 indicating that the recording reservation data is appended thereto, as shown for example in FIG. 19.

If the icon 281 is clicked, the recording reservation data is stored in the reservation recording setting program 104, so that the personal computer 1-1 is able to use the recording reservation data.

So, if the user of the personal computer 1-2 transmits recording reservation data, the user of the personal computer 1-1 is able to record the pre-set program.

The operation of the reservation recording setting program 104 generating the AV contents 151 of executing the reservation recording based on specified reservation data received from the portable telephone set 17 is explained. When the portable telephone set 17 accesses to the personal computer 1 through the telephone network 6, the personal computer 1 executes the processing of supplying the IP address to the portable telephone set 17 by the resident dial-up server 124 to set the connection to the portable telephone set 17. After setting the connection to the portable telephone set 17, the web server 125 of the personal computer 1 transmits a pre-set file stated in e.g., the HTML (hyper text markup language) or data furnished from the CGI program 106 to the portable telephone set 17.

FIG. 20 illustrates a picture to be displayed by the portable telephone set 17 operating a pre-set browser based on a pre-set file furnished from the web server 125 of the personal computer 1.

Figure 20A:
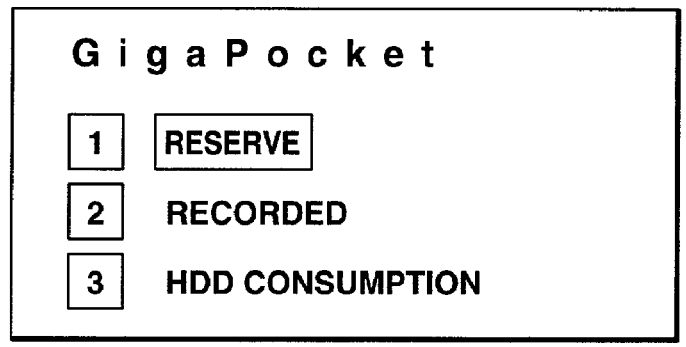
FIGS. 20A to 20C illustrate pictures displaying data of an E-mail having recording reservation data appended thereto, by an E-mail program.

After the portable telephone set 17 accesses to the personal computer 1 through the telephone network 16, the web server 125 of the personal computer 1 transmits data for displaying the picture for selecting the menu shown in FIG. 20A to the portable telephone set 17. The user of the portable telephone set 17 is able to select the reservation setting, confirmation of the AV contents recorded by the reserved recording or the display of the consumed amount of the HDD, as index of time recordable by reserved recording, in accordance with the menu shown in FIG. 20A.

In keeping with the selection of the menu shown in FIG. 20A, the portable telephone set 17 transmits to the personal computer 1 a message requesting the display of the setting for the reserve, corresponding to the command labelled "reserved" in the drawing, confirmation of the AV contents recorded by reservation recording, corresponding to the command labelled "recorded" in the drawing, or the display of the used amount of the HDD, as an index of the recordable time by recording reservation, corresponding to a command labelled "used amount of HDD" in the drawing.

Figure 20B:
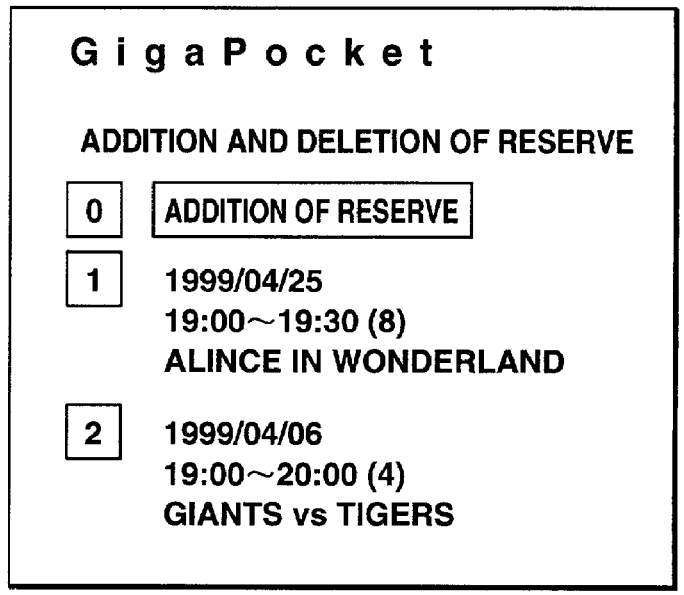

When the user selects a command labelled "reserved" of the menu shown in FIG. 20A, and a message corresponding to the request for reservation setting is transmitted from the portable telephone set 17 to the personal computer 1, the CGI program 106' of the personal computer 1 transmits data for displaying a picture selecting the menu for adding or deleting the reservation, as shown for example in FIG. 20B, through the web server 125 to the portable telephone set 17. When the command labelled "addition of reservation" shown in the example of FIG. 20B is selected, the portable telephone set 17 transmits a message to the effect of addition of the recording reservation to the personal computer 1.

In the example of FIG. 20B, "1999/04/25 19:00 to 19.30 (8), Alince in Wonderland" denotes the contents of the recording reservation as already set in the personal computer 1. The personal computer 1 indicates that a program with the title "Alince in Wonderland", aired in channel 8 as from 19:00 until 19:30 on Apr. 25, 1999, is to be recorded by reserve. In similar manner, "1999/04/06 19:00 to 20:00 (4) Giants versus Tigers" denotes the contents of the recording reservation already set on the personal computer 1. Thus, the personal computer 1 indicates that the program with the title "Giants versus Tigers", aired in channel 4 as from 19:00 until 19:30 on Apr. 6, 1999, is to be recorded by reservation recording.

Figure 20C:
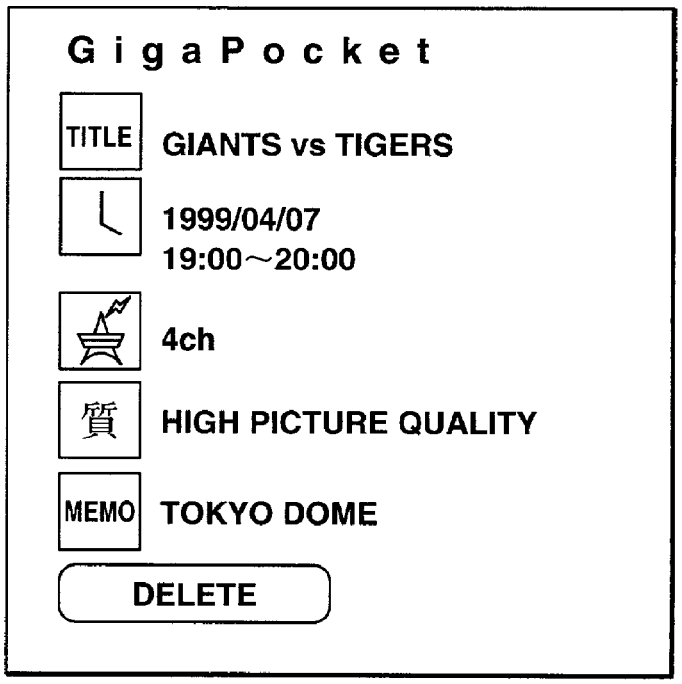

When the user selects the command labelled "addition of reserve" of the menu shown in FIG. 20B, and the personal computer 1 transmits to the personal computer 1 a message to the effect that the reservation has been added, the web server 125 of the personal computer 1 causes the portable telephone set 17 to display a picture inputting a title of the program, date and time of airing, channel recording quality and memo, as shown for example in FIG. 20C.

FIG. 20C shows an example in which the purport that a program with the title "Giants versus Tigers", aired in channel 4 as from 19:00 until 20:00 on Apr. 7, 1999, is to be recorded with high picture quality has been inputted to the portable telephone set 17. If, from this state, an operation for commanding the picture recording is made to the portable telephone set 17, the portable telephone set 17 generates recording reservation data, based on the input data, and transmits a message for appointing the recording, inclusive of the recording reservation data, to the personal computer 1. The web server 125 of the personal computer 1 sends a message for recording reservation including the recording reservation data to the CGI program 106, which then sends the recording reservation data to the recording reservation setting program 104 for reservation recording.

Figure 21:
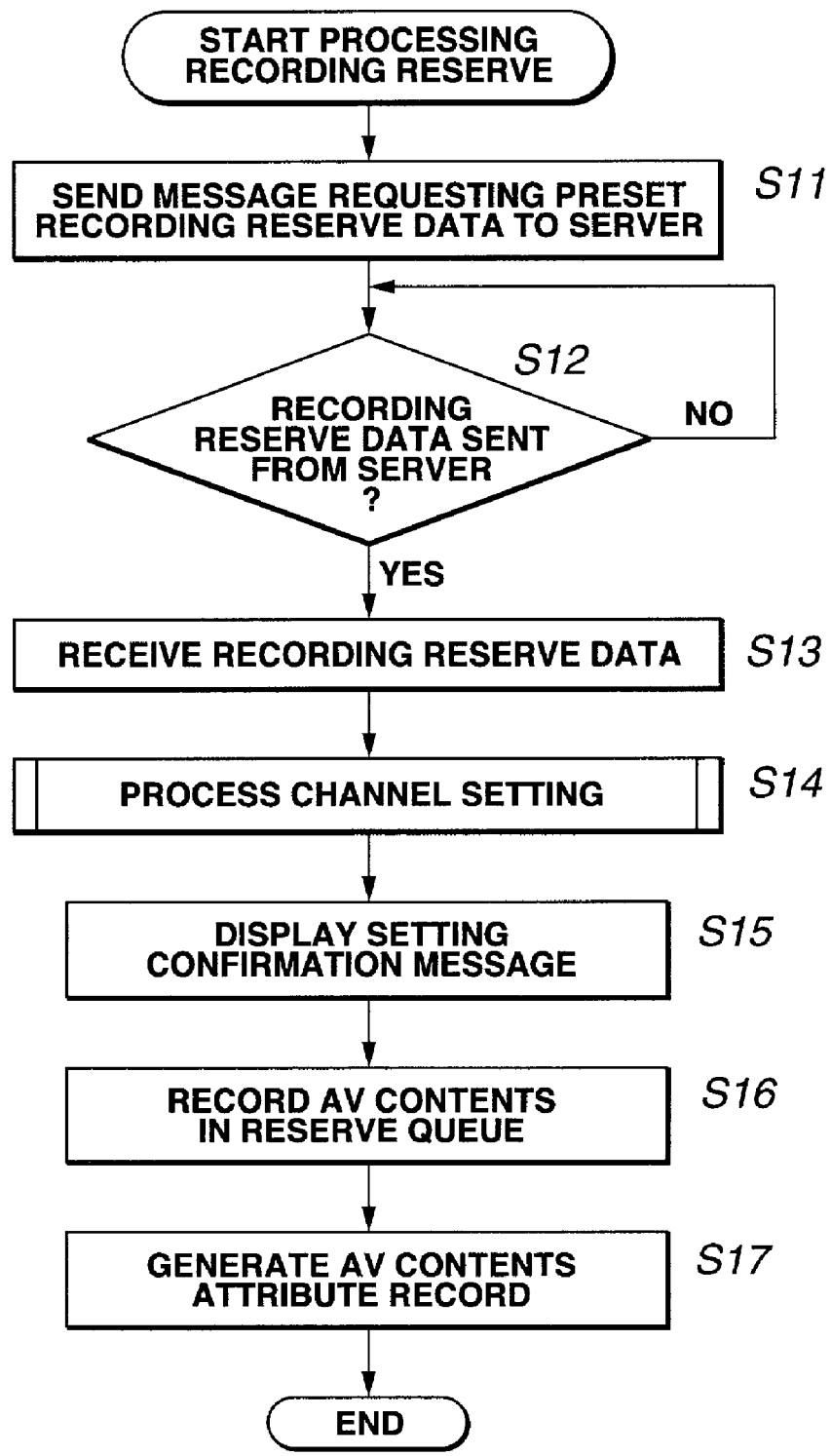
FIG. 21 is a flowchart for illustrating the processing for recording reservation.

The processing for reservation recording in case the reservation recording setting program 104 and the WWW browser 106 have been loaded on the RAM 23 so that the CPU 21 executes the reservation recording setting program 104 and the WWW browser 106 is now explained by referring to the flowchart of FIG. 21. At step S11, the WWW browser 106 transmits a message requesting recording reservation data corresponding to a pre-set program to the server 7 in accordance with a user operation. At step 102, the WWW browser 106 verifies whether or not the recording reservation data has been transmitted from the server 7. If it is found that the recording reservation data has not been transmitted from the server 7, the WWW browser 106 reverts to step 12 to repeat the processing until transmission of the recording reservation data from the server 7.

If it is found at step S12 that the recording reservation data has been transmitted from the server 7, the WWW browser 106 proceeds to step S13 to receive the recording reservation data to send the received recording reservation data to the reservation recording setting program 104.

At step S14, the reservation recording setting program 104 executes the processing for channel setting, based on the furnished recording reservation data. The processing for channel setting will be explained in detail with reference to FIG. 22.

At step S15, the reservation recording setting program 104 displays a reservation setting confirming message in a window shown for example in FIG. 15.

At step S16, the reservation recording setting program 104 records the AV contents 151 in reservation queue, inclusive of a moving picture data file 161, which has acquired a pre-set region of the HDD 31, based on the furnished recording reservation data. At step S17, the reservation recording setting program 104 causes a contents database 152 to generate an AV contents attribute record 152, corresponding to the AV contents 151 in reservation queue, to terminate the processing.

In this manner, the reservation recording setting program 104 and the WWW browser 106 are able to execute the reserving of a pre-set program speedily.

Figure 22:
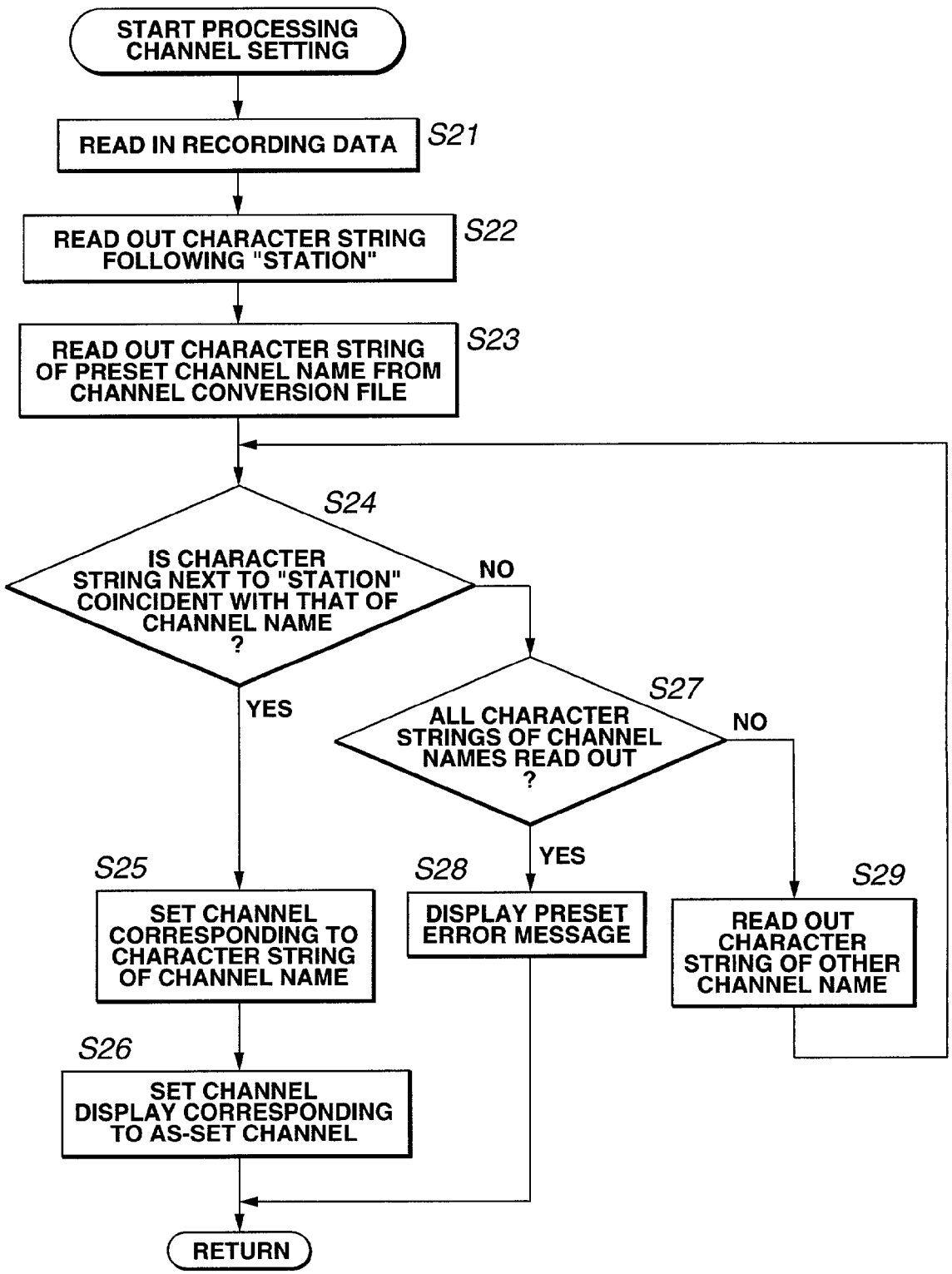
FIG. 22 is a flowchart for illustrating the processing for channel setting.

The processing for channel setting, corresponding to step S14 of FIG. 21, is explained with reference to the flowchart of FIG. 22. At step S21, the reservation recording setting program 104 reads-in the recording reservation data furnished from the WWW browser 106. At step S22, the reservation recording setting program 104 reads out the character string next following "station" of the recording reservation data.

At step S23, the reservation recording setting program 104 reads out a character string of a pre-set channel name from a channel conversion file. At step S24, the reservation recording setting program 104 verifies whether or not the character string next following "station" is coincident with the character string of a pre-set channel name. If it is verified that character string next following "station" is coincident with the character string of the pre-set channel name, the reservation recording setting program 104 proceeds to step S25 to set a channel corresponding to the character string of the pre-set channel name.

At step S26, the reservation recording setting program 104 sets channel demonstration corresponding to the channel as set at step S25 (that is sets data for channel demonstration and data for channel name demonstration) to terminate the processing.

If it is verified at step S24 that character string next following "station" is not coincident with the character string of the pre-set channel name, the reservation recording setting program 104 proceeds to step S27 to verify whether or not the totality of the character strings of the channel names have been read out. If it is verified that the totality of the character strings of the channel names have been read out, the reservation recording setting program 104 proceeds to step S28 to display a message reading that no channel has been found on a CRT 30 to terminate the processing.

If it is verified at step S27 that the totality of the character strings of the channel names have not been read out, the reservation recording setting program 104 proceeds to step S29 to read out a character string of an other channel name. The reservation recording setting program 104 then reverts to step S24 to repeat the processing for verifying the possible character string coincidence.

As described above, the reservation recording setting program 104 is able to set a pre-set channel despite certain ambiguity in the character string next following the "station" of the recording reservation data.

Figure 23:
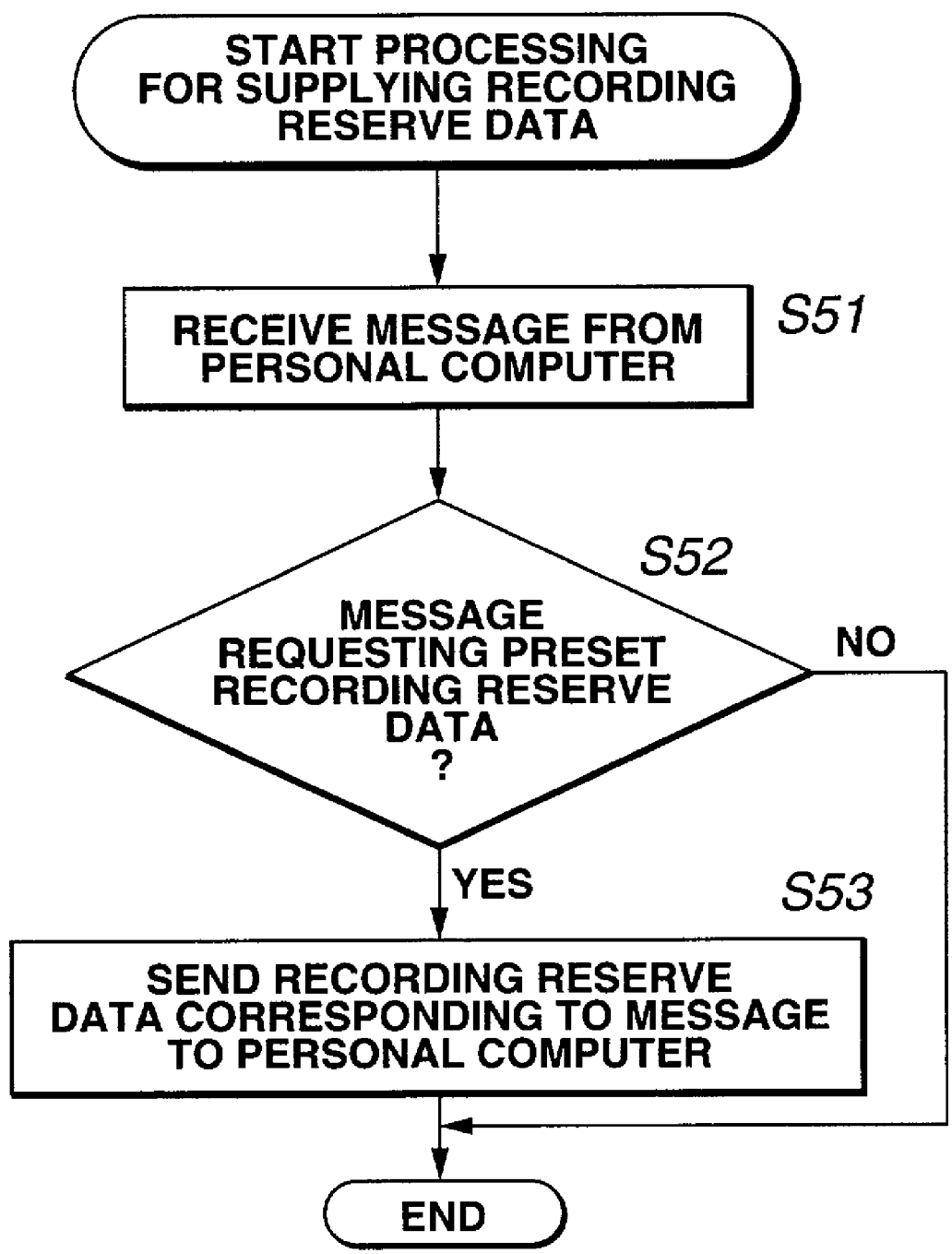
FIG. 23 is a flowchart for illustrating the processing of furnishing recording reservation data by a server.

Referring to the flowchart of FIG. 23, the processing for furnishing recording reservation data by a server 7 in case the Web server program is loaded on a RAM 83 and a CPU 81 executes a Web server program, is now explained. At step S51, the Web server program receives a message from the personal computer 1-1 based on e.g., the HTTP. At step S52, the Web server program verifies whether or not a message received from the personal computer 1-1 is a message requesting pre-set recording reservation data. If it is verified that the message received from the personal computer 1-1 is a message requesting pre-set recording reservation data, the Web server program proceeds to step S53 to transmit recording reservation data corresponding to the message to the personal computer 1-1 to terminate the processing.

If it is verified at step S52 that the message received from the personal computer 1-1 is not a message requesting pre-set recording reservation data, the step S53 is skipped to terminate the processing.

In this manner, the server 7 furnishes pre-set recording reservation data to the personal computer 1-1.

Figure 24:
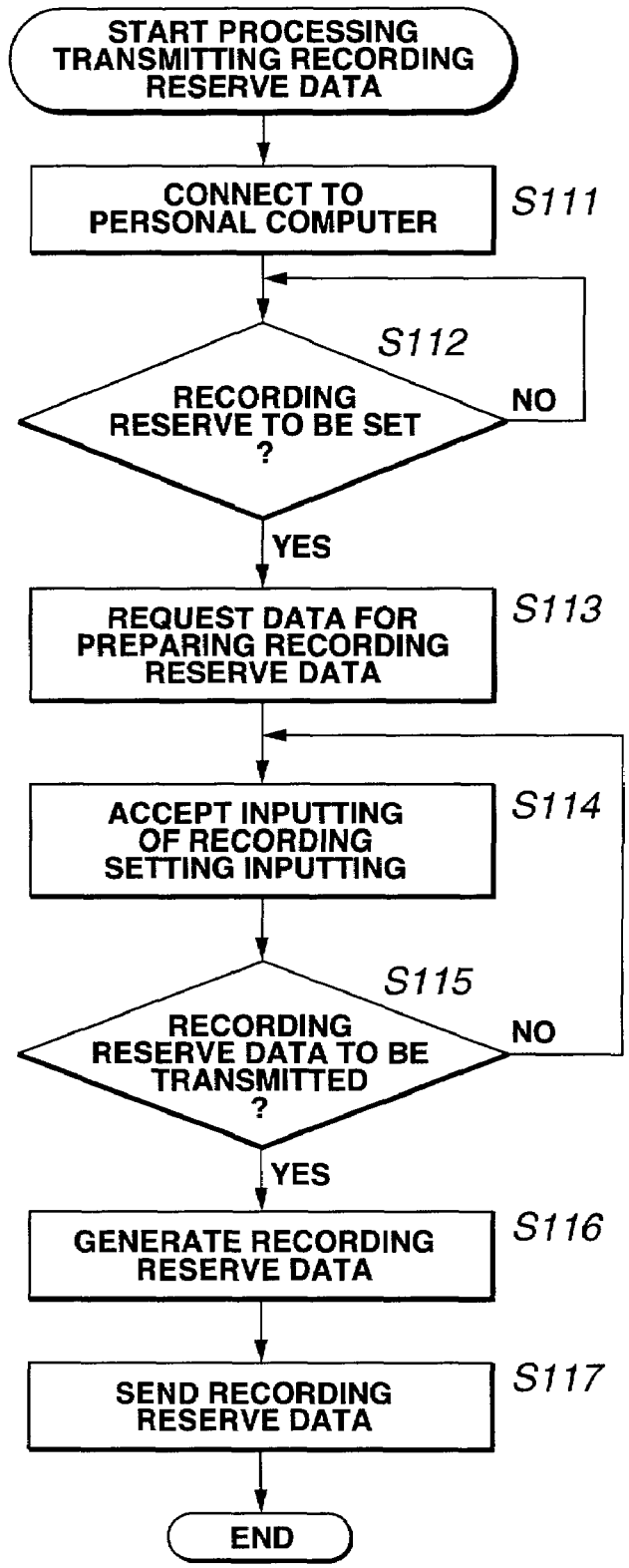
FIG. 24 is a flowchart for illustrating the processing of transmitting recording reservation data of a portable telephone set.

Referring to the flowchart of FIG. 24, the processing of transmitting recording reservation data by the potable telephone set 17 is explained. At step S111, the potable telephone set 17 calls the telephone number associated with the personal computer 1, and transmits the user name or the pre-set password to make connection to the personal computer 1. At step S112, verifies whether or not reservation recording is to be set, based on e.g., a menu selection input. If it is found that no reservation recording is to be set, the potable telephone set 17 reverts to step S112 to repeat the processing until reservation recording is set.

If it is found at step S112 that the reservation recording is to be set, the potable telephone set 17 proceeds to step S113 to ask the potable telephone set 17 for data for preparing the recording reservation data.

At step S114, the potable telephone set 17 demonstrates a pre-set picture, based on data for preparing the recording reservation data received from the personal computer 1, to accept inputting the setting of reservation recording. At step S115, the potable telephone set 17 decides whether or not to transmit the recording reservation data, based on the input at a pre-set button. If it is determined that the recording reservation data is not to be sent, the potable telephone set 17 reverts to step 114 to repeat the processing for inputting the setting for reservation recording.

If it is determined at step S115 that the recording reservation data is to be transmitted, the potable telephone set 17 proceeds to step S116 where the potable telephone set 17 generates the recording reservation data based on the input reservation recording setting. At step S117, the potable telephone set 17 transmits the recording reservation data generated at step S116 to the personal computer 1 to terminate the processing.

In this manner, the potable telephone set 17 is able to transmit the pre-set recording reservation data to the potable telephone set 17.

Figure 25:
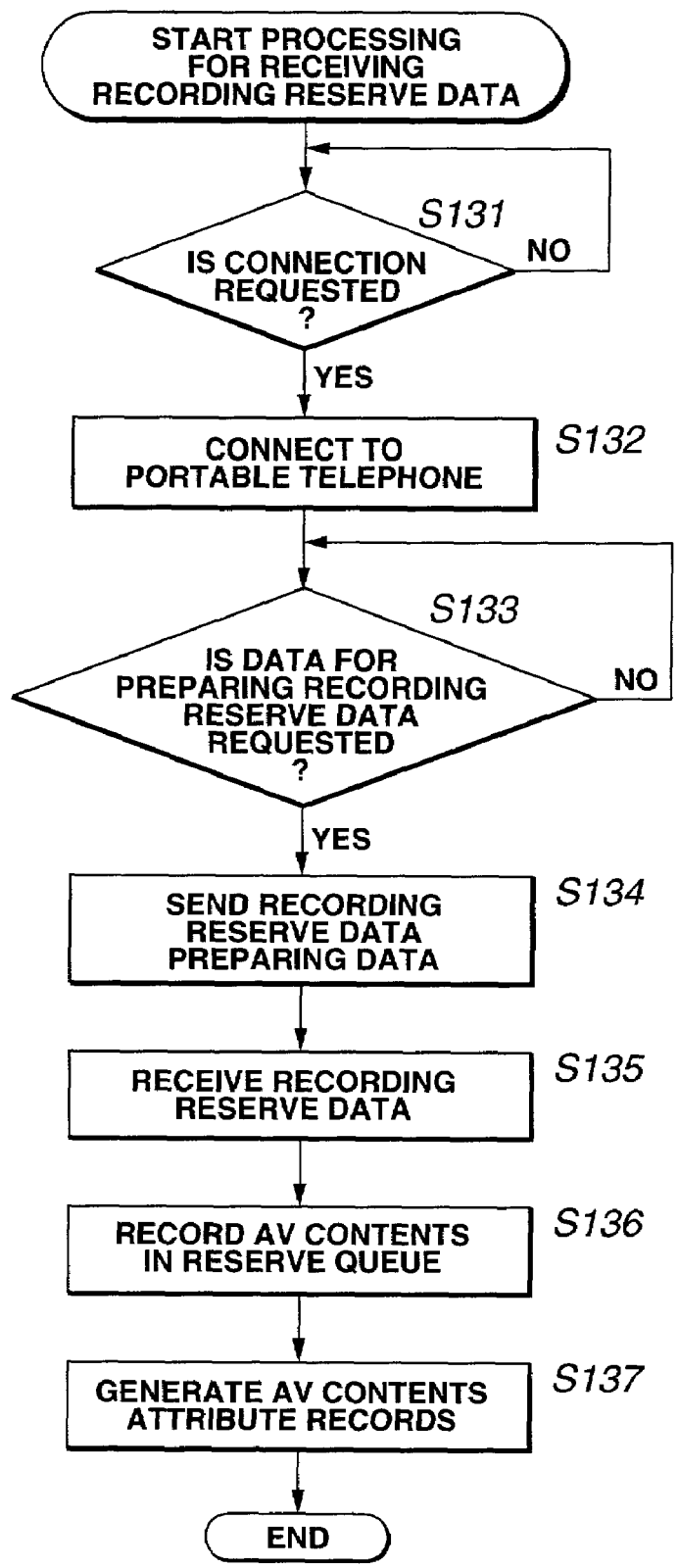
FIG. 25 is a flowchart for illustrating the processing of receiving recording reservation data of a personal computer.

Referring to the flowchart of FIG. 25, the processing of receiving the recording reservation data of the personal computer 1 is explained. At step S131, the dial-up server 124 of the personal computer 1 verifies whether or not the connection is being requested by the potable telephone set 17, by the processing corresponding to step S111. If it is determined that the connection is not requested from the potable telephone set 17, the dial-up server 124 reverts to step S131 to repeat the processing until connection is requested from the potable telephone set 17.

If it is determined that the connection is requested from the potable telephone set 17, the dial-up server 124 proceeds to step S132 where the dial-up server 124 connects to the potable telephone set 17. At step S133, the web server 125 of the personal computer 1 verifies whether or not data for preparation of the recording reservation data corresponding to step S113 is being requested from the potable telephone set 17. If it is determined that the data for preparation of the recording reservation data is not being requested from the potable telephone set 17, the web server reverts to step S133 to repeat the processing until the data for preparing the recording reservation data is requested from the potable telephone set 17.

If it is determined at step S133 that the data for preparing the data for preparing the recording reservation data is requested from the potable telephone set 17, the web server 125 proceeds to step S134 where the CGI program 106' of the personal computer 1 receives the recording reservation data in association with the processing at step S117 to send the received recording reservation data to the reservation recording setting program 104.

At step S136, the reservation recording setting program 104 of the personal computer 1 records the AV contents 151 in the reservation queue, based on the received recording reservation data. At step S137, the reservation recording setting program 104 of the personal computer 1 generates the AV record attribute record 152 corresponding to the AV contents 151 in reservation queue generated at step S136 to terminate the processing.

In this manner, the personal computer 1 is able to set the reservation recording based on the recording reservation data furnished from the potable telephone set 17.

In carrying out the reservation recording by the above-described procedure, the API (application program interface) on the Windows (trademark) can be exploited as follows:

In a dynamic library, having a filename of srr.dll, a number of APIs are included, and may be invoked using the C-language.

11.

The following are typical of the API. The manner of using the respective APIs is also explained.

| | |
|---|---|
| SrrOpen( ) | API starts to be used |
| SrrClose( ) | API ceased to be used |
| SrrGetFirstChannel( ) | A first one of the channel list is acquired |
| SrrGetNextChannel( ) | The next one of the channel list is acquired |
| SrrGetFirstReservation( ) | A first one of the reservation list is acquired |
| SrrGetNextReservation( ) | The next one of the reservation list |
| SrrSetReservation( ) | Reservation is to be set |
| SrrDeleteReservation( ) | The reservation already set is deleted |

For reading-in the registered information, using the registered information, the API of a name beginning with the "SrrGetFirst" and the API of a name beginning with "SrrGetNext" are used. For example, if the channel information is to be read-in, "SrrGetFirstChannel" and "SrrGetNextChannel" are used.

The SrrGetFirstChannel reads-in the first channel information. If, by the return value of the SrrGetFirstChannel, there is yet left the channel information to be read-in, the next information is acquired by the SrrGetNextChannel, and so on.

1. The first information is read in by the SrrGetFirst*( ).
2. Except if data to be read-in is left, the processing comes to a close.
3. The next information is read-in by the SrrGetNext*( ).
4. Return to 2.

In reading in the video capsule information, basically the same sequence is used.

SrrVirtualChannel (Structure for Channel Information)

The SrrVirtualChannel is a structure for exchanging the channel information. The SrrVirtualChannel is used not only in the API for acquiring the channel information, but also as a member of the SrrRecordInfo for handling the video capsule information.

typedef struct_SrrVirtualChannel

```
{
WORD wVersion;                                //version information
WORD wCH;                                     //channel (frequency)
WORD wDicspCh;                                //(virtual) channel
                                                for display
BYTE bCaption[SRR_MAX_CHANNEL_CAPTION];
                                              //caption for channel
}SrrVirtualChannel;
#define SRR_VCHANNEL_VERSION       (1)
#define SRR_MAX_CHANNEL_CAPTION    (256)
```

Basically, the value of this stricture is not prepared on the side program. Using the APIs of the SrrGetFirstChannel and SrrGetNext Channel, the channel information is acquired, using this structure, for utilization.

If data is to be prepared on the side program, SRR_VCHANNEL_VERSION is substituted for wVersion.

SrrTime (Structure for Date and Time Information)

SrrDate1 is a structure for exchanging the date/time information, such as date/time of reservation or recording. There is no API handling the data by itself and use is simply made as a member for holding the date and time of start and end with SrrRecordInfo.

typedef struct_SrrTime

```
{
    WORD    wVersion;    //version information
    USHORT  year;        //year A.D.
    Byte    month;       //month
    Byte    day;         //day
    Byte    hour;        //hour
    Byte    minute;      //minute
}SrrTime;
``` define SRR_TIME_VERSION (1)

If data is to be formulated on the side program, SRR_TIME_VERSION is substituted in mVersion.

SrrRecorInfo (Structure for Video Capsule Information)

The SrrRecorInfo is a structure used for exchanging the video capsule structure. In the API handling the reserved video capsule or the recorded video capsule, the information is exchanged by this structure.

typedef struct_SrrRecordInfo

```
{
    WORD              Wversion; //version information
    DWORD             DwID; //ID uniquely determining the video
                      capsule
    SrrTime           StartTime; //recording start time
    SrrTime           EndTime; //recording end time
    WORD              WrecMode; //r; mode (picture quality)
    SrrVirtualChannel svCh; // recording channel information
    BYTE              BprogramName [SRR_MAX_
                      PROGRAM_NAME];//program name
    BYTE              BprogramMemo [SRR_MAX_PROGRAM_
                      MEMBER];//PROGRAM MEMO];
                      //program memo
}SrrRecordInfo;
``` define SRR_MAX_PROGRAM_MEMO (256)

define SRR_MAX_PROGRAM_MEMO (4096)

define SRR_RECORDINFO_VERSION (1) //wVersion

```
#define SRR_REC_MODE_HIGH     (1)//wRecMode =
                                  MPEG2 8 Mbps
#define SRR_REC_MODE_NORMAL   (2)//wRecMode =
                                  MPEG2 4 Mbps
#define SRR_REC=MODE_VIDEOCD  (3)//wRecMode =
                                  MPEG1 1.5 Mbps
                                  (VideoCD compatible)
```

In the APIs specifying an optional video capsule, the video capsule is specified using this structure dwID.

If data is to be prepared on the side program, SPR=RECORDINFO_VERSION is substituted for wVersion.

The dwID is an ID for identifying the video capsule automatically generated on the side srr.dll. If reference is made, no value is substituted on the side program.

For wRecMode, one of constants beginning with SRR_REC_MODE is specified.

SRROpen( )(API Begins to be Used)

Contents

The API is opened for initialization to return an ID for API accessing.

Style

SRRAPI SRRRESULT_stdcall

SrrOpen(DWORD*dwID)

Input

*dwID: a pointer for an ID variable is delivered.

Output

*dwID: opened ID

This ID variable needs to be delivered as an argument in invoking all APIs until SrrClose( ).

Return value

0: success minus value: failure (error code)

SrrClose( )(API Use End)

Contents

The use of the API comes to a close.

Style

SRRAPI SRRRESULT_stdcall

SrrClose(DWORD dwID);

Input
  dwID: ID acquired at SrrOpen

Output
  none

Return value

0: success minus value: failure (error code)

SrrGetFirstChannel( )(The First One of the Channel List is Acquired)

Contents

The information of the as-set reception channel is acquired.

In this API, the information of the first one channel of the channel list is acquired. If the next channel information is taken out sequentially, SrrGetNextChannel is used. In this case, the IpdwIndex, returned by this function, is delivered as an argument.

If there is no channel information acquired, an error (SRRERR_NOMORE_CHANNEL) is returned.

```
Style
    SRRAPI SRRRESULT_stdcall
    SrrGetFirstChannel(
        DWORD dwID,
        DWORD *IpdwIndex,
        SrrVirtualChannel *IpVChannel );
```

Input
    dwID: ID acquired by SrrOpen
    lpdwIndex: pointer to a variable for storing an index to a channel list
    lpVChannel: pointer of a structure for storing the virtual channel information Output
    Pointer for storing an index to a channel list
    lpVChannel: pointer return value of a structure for storage of the virtual channel information Return value
    0: success
    minus value: failure (error code)

SrrGetNextChannel (The Next One of the Channel List is Acquired)

Contents
    The information of the as-set reception channel is acquired.
    After invoking the SrrGetFirstChannel, the present API is repeatedly invoked to acquire the channel information from one channel information to another.
    A value of the lpdwIndex acquired with the SrrGetFirstChannel is first set and subsequently the value acquired in the present API is set.
    If there is no channel information to be acquired, an error (SRRERR_NOMORE_CHANNEL) is returned.

```
        Style
            SRRAPI SRRRESULT_stdcall
            SrrGetNextChannel(
                DWORD dwID,
                DWORD *lpdwIndex,
                SrrVirtualChannel *lpVChannel );
```

Input
    dwID: ID acquired at SrrOpen
    lpdwIndex: pointer to a variable for storing an index to the channel list
    lpVChannel: pointer output of a structure for storing the virtual channel information
    lpdwIndex: pointer to a variable for storing an index to the channel list
    lpVChannel: pointer return value of a structure for storing the virtual channel information
    0: success
    minus value: failure (error code)

Using Example

```
    /* all information of the registered channels are output */
    DWORD srrID;
    DWORD index;
    SrrVirtualChannel vch;
    SrrOpen(&srrID);
    if(! SrrGetFirstChannel (srrID, &index, &vch)){
        do {
            printf("Ch:%d, Ch:%d for display, caption: %s¥n", vch.wCh,
            vch.wDispCh, vch.bCaption);
        } while(! SrrGetNextChannel (srrID, &index, &vch)):
    }
    SrrClose(srrID);
```

SrrGetFirstReservation( )(The First Reservation Information of the Reservation List is Acquired)

Contents
    The information of the as-set reservation video capsule is acquired.
    The present API acquired a first reservation information of the reservation list.
    For sequentially taking out the next following reservation list, SrrGetNextReservation is used. At this time, the lpdwIndex, returned by this API, is delivered as an argument.
    If there is no reservation information acquired, an error (SRRERR_NOMORE_RESERVATION) is returned as a return value.

Style

```
SRRAPI SRRRESULT_stdcall
SrrGetFirstReservation(
    DWORD dwID,
    DWORD *lpdwIndex,
    SrrRecordInfo * lpReservation);
```
Input
    dwID: ID acquired at SrrOpen
    lpdwIndex: pointer to a variable for storing an index to the channel list
    lpReservation: pointer of a structure for storing the reservation recording information
Output
    lpdwIndex: pointer to a variable for storing an index to the channel list
    lpReservation: pointer of a structure for storing the reservation information
Return value
    0: success
    minus value: failure (error code)

SrrGetNextReservation( ) (The Next Reservation Information of the Reservation List is Acquired)

Contents
    The information of the as-set reservation video capsule is acquired.
    After invoking the SrrGetFirstChannel, the present API is repeatedly invoked to acquire the channel information from one channel information to another.
    A value of the lpdwIndex acquired with the SrrGetFirstChannel is first set and subsequently the value acquired in the present API is set.
    If there is no channel information to be acquired, an error (SRRERR_NOMORE_CHANNEL) is returned.

```
        Style
            SRRAPI SRRRESULT_stdcall
            SrrGetNextReservation(
                DWORD dwID,
                DWORD *lpdwIndex,
                SrrVirtualInfo * lpReservation );
```

Input
    dwID: ID acquired at SrrOpen
    lpdwIndex: pointer to a variable for storing an index to the channel list
    lpReservation: pointer output of a structure for storing the virtual channel information Output
    lpdwIndex: pointer to a variable for storing an index to the channel list
    lpReservation: pointer output of a structure for storing the virtual channel information Return value
  0: success
  minus value: failure (error code)

Using Example
/* all information of the registered channels are output */
char *mode;
DWORD srrID;
DWORD index;
SrrRecordInfo recinfo;
SrrOpen(&srrID);

```
if(! SrrGetFirstReservation (srrID, &index, &recinfo)){
   do {
      switch(recInfo.wRecMode){
         case SRR_REC_MODE_HIGH:
            Mode = "MPEG2 8 Mbps";
            break;
         case SRR_REC_MODE_NORMAL:
            mode = "MPEG2 4 Mbps";
            break;
         case SRR_REC_MODE_VIDEOCD:
            mode = "MPEG1 1.5 Mbps";
            break;
         default:
            Mode = "Unknown mode";
      }
      printf("%04d/%02d/%02d %02d:%02d ~ %04d/%02d/%02d %02d:%02d¥n"
         recInfo.startTime.year, recInfo.startTime.month,
      recInfo.startTime.day,
         recInfo.startTime.hour, recInfo.startTime.minute,
      recInfo.endTime.year,    recInfo.endTime.month,
         recInfo.endTime.day,
      recInfo.endTime.hour, recInfo.endTime.minute,
      printf("%2dch (%s)d¥n"), recInfo.svCh.DispCh, mode);
      printf("%s¥n", recInfo.bProgramName);
      printf("%s¥n", recInfo.bProgramMemo);
      Printf("----¥n");
   } while(! SrrGetNextReservation(srrID, &index, &recInfo));
}
SrrClose(srrID);
```

SrrSetReservation( )(Reservation is Set)

Contents
The SrrRecordInfo, in which the reservation information is pre-set, is registered in the reservation list.
In the SrrRecordInfo, bProgramName and bProgramMemo can be omitted, while no value needs to be set in dwID.
In svCh, basically a value acquired in the SrrGetFirstChannel and SrrGetBNextChannel is set.

```
            Style
         SRRAPI SRRRESULT_stdcall
         SrrSetReservation(
            DWORD dwID,
            SrrRecordInfo * IpReservation);
```

Input
  dwID: ID acquired at SrrOpen
  lpReservation: pointer to a variable for storing the reservation information Output
  lpReservation: pointer output of a structure for storing the virtual channel information
  In case of success, a value is set in the SrrRecordInfo and returned.

Return value
  0: success
  minus value: failure (error code)

Using Example
/* an instant of the 21st century is reserved for recording*/
char *mode;
DWORD srrID;
DWORD index;
SrrRecordInfo recInfo;
SrrVirtualChannel vch;
SrrOpen(&srrID);
SrrGetFirstChannel (srrID, &index, &vch);
recInfo.startTime.year=2000;
recInfo.startTime.month=12
recInfo.startTime.day=31;
recInfo.startTime.hour=23
recInfo.startTime.minute=30
recInfo.endTime.year=2001;
recInfo.endTime.month=1
recInfo.endTime.day=1;
recInfo.endTime.hour=0
recInfo.endTime.minute=30
recInfo.svCh.DispCh=vch;
strcpy (recInfo.bProgramName, "an instant most like the 21st century");
strcpy (recInfo.bProgramMemo, "historical one hour during which the 20th century is changed to the 21st century");
SrrSetReservation (srrID, &recInfo);
SrrClose(srrID);

SrrDeleteReservation( ) (Reservation Already Set is Deleted)

Contents
  The reserved video capsule, already set, is deleted.
  In the dwReservationID, dwID of SrrRecordInfo, acquired in the SrrGetFirstReservation and SrrGetNextReservation etc are specified.

Style
  SRRAPI SRRRESULT_stdcall
  SrrDeleteReservation(
    DWORD dwID,
    DWORD dwReservationID);

Input
  dwID: ID acquired at SrrOpen
  dwReservation ID: ID of a reserved video capsule (dwID of SrrRecordInfo)

Output
  None

Return value
  0: success
  minus value: failure (error code)

Figure 26:
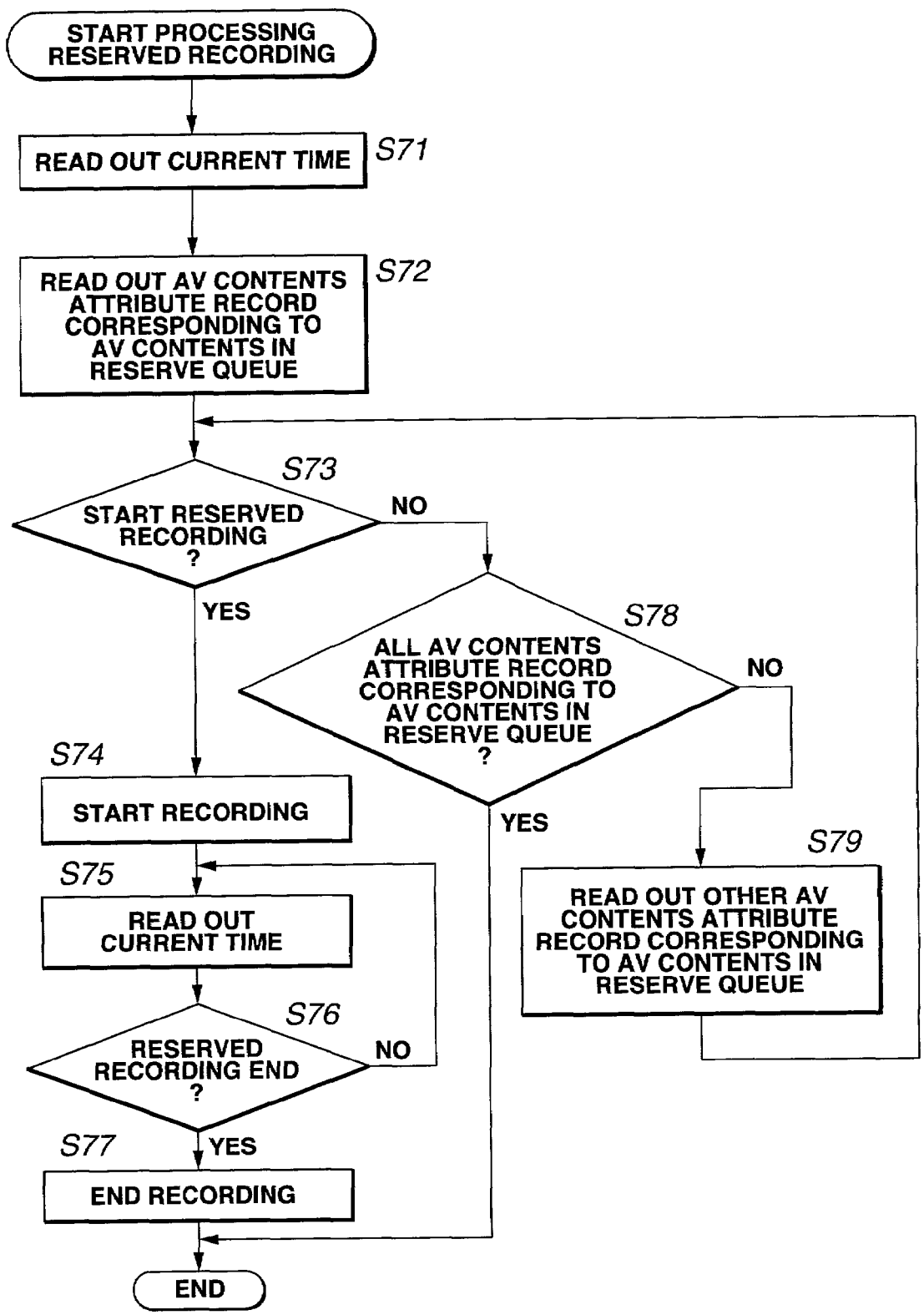
FIG. 26 is a flowchart for illustrating the processing for recording by reservation recording.

Using Example
/*a first reservation information of the reservation list is deleted*/
DWORD srrID;
DWORD index;
SrrRecordInfo recInfo;
SrrOpen (&srrID);
if (! SrrGetFirstReservation(srrID, &index, &recInfo)){
  SrrDeleteReservation(srrID, recInfo.dwID);
}
SrrClose(srrID);

Referring to the flowchart of FIG. 26, the processing for the reservation recording in case the reservation monitoring program 105 resident in the RAM 23 is executed by the CPU 21 is now explained.

At step S71, the reservation monitoring program 105 reads out the current time from the RTC, not shown. At step S72, the AV contents attribute record 152 corresponding to the AV contents 151 in a pre-set reservation queue is read out.

At step S73, the reservation monitoring program 105 compares the current time to the recording start time contained in the AV contents attribute record 152 to check whether or not the reservation recording is to be started. If it is verified that the reservation recording should be started, the program moves to step S74 to start the recording. The reservation monitoring program 105 overwrites data of the picture generated in the picture processing board 34 on the previously recorded data file 161.

At step S75, the reservation monitoring program 105 reads out the current time from the RTC, not shown. At step S76, the reservation monitoring program 105 compares the current time to the recording end time contained in the AV contents attribute record 152 to check whether or not the recording reservation is to be terminated. If it is verified that the recording reservation is not at an end, the recording is continued so that the program moves to step S75 to repeat the processing of verifying the end time.

If it is verified at step S76 that the recording reservation is to be terminated, the program moves to step S77 where the reservation monitoring program 105 changes data of the AV contents attribute record 152 to a pre-set value. The recording then comes to a close to terminate the processing.

If it is verified at step S73 that the recording reservation is not to be started, the program moves to step S78 where the reservation monitoring program 105 verifies whether or not the AV contents attribute record 152 corresponding to the entire AV contents 151 in the reservation queue has been read out in its entirety. If it is verified that the AV contents attribute record 152 corresponding to the entire AV contents 151 in the reservation queue has not been read out in its entirety, the program moves to step S79, where the reservation monitoring program 105 reads out the AV contents attribute record 152 corresponding to another AV contents 151 in the reservation queue. The program then reverts to step S73 to repeat the processing for decision as to starting the recording reservation.

If it is verified at step S78 that the AV contents attribute record 152 corresponding to the AV contents 151 in the reservation queue has been read out in its entirety, there lack AV contents 151 that are to be recorded by reservation, so that processing comes to a close.

As described above, the recording monitoring program 105 executes the reservation recording based on the AV contents 151 in the reservation queue and on the current time.

Figure 27:
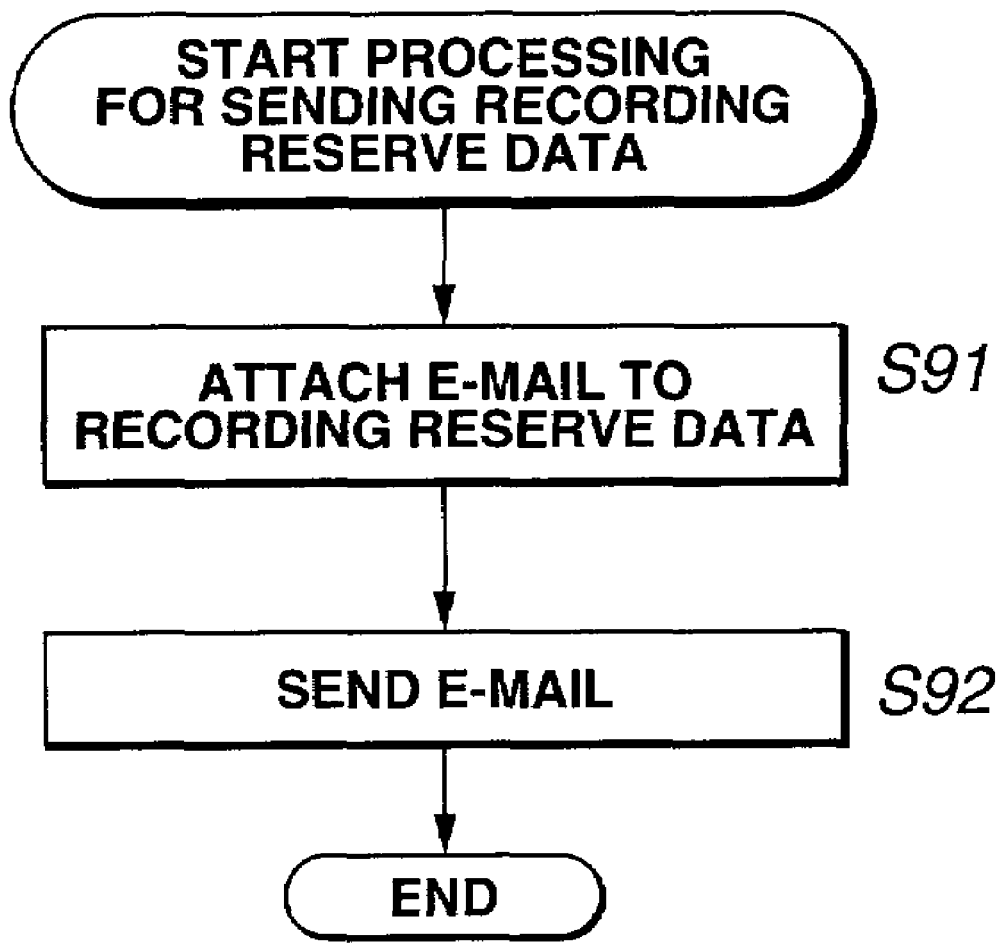
FIG. 27 is a flowchart for illustrating the processing for transmission of recording reservation data by the E-mail program.

The processing of transmitting recording reservation data by an E-mail program of the personal computer 1-2 is explained with reference to the flowchart of FIG. 27. At step S91, the E-mail program of the personal computer 1-2 appends the recording reservation data to the E-mail. At step S92, the E-mail program transmits the E-mail, having the recording reservation data, appended thereto, to the personal computer 1-1 to terminate the processing.

As described above, the E-mail program is able to transmit the recording reservation data to the personal computer 1-1. The personal computer, on receipt of the E-mail, having the recording reservation data, appended thereto, is able to make the reservation for recording by the processing similar to that explained with reference to the flowchart of FIG. 21.

Referring to FIG. 28, a medium used in installing a program for executing the above-described sequence of operations on a personal computer 1-1 or 1-2 or in a server 7 to set a state executable by the personal computer 1-1 or 1-2 or by the server 7 is explained.

Figure 28A:
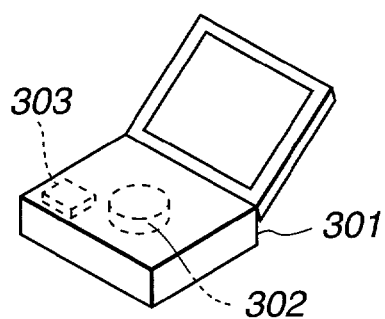
FIGS. 28A to 28C illustrate a medium.

The program can be furnished in a pre-installed state on a hard disc 302, as a recording medium enclosed in a personal computer 301, corresponding to the hard disc enclosed in the personal computer 301, or in a pre-installed state on a semiconductor memory 303, as shown in FIG. 28A.

Figure 28B:
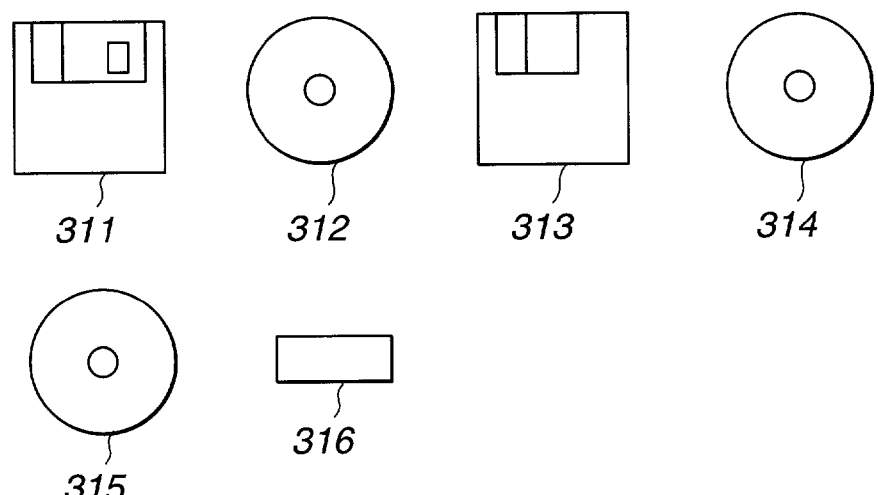
Figure 28C:
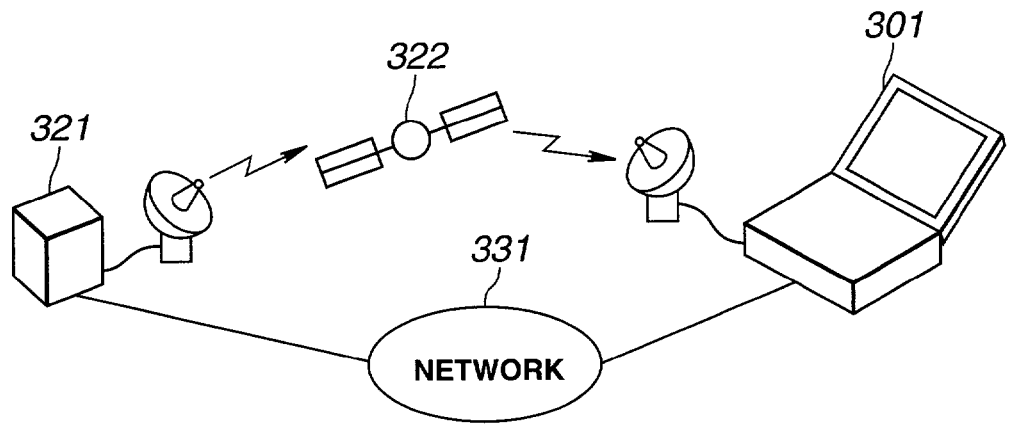

Alternatively, the program can be transiently or permanently stored in a recording medium, such as a floppy disc 311, a CD-ROM (compact disc-read only memory) 312, MO (magneto-optical) disc 313, DVD (digital versatile disc) 314, a magnetic disc 315 or a semiconductor memory 316, and furnished as packaged software, as shown in FIG. 28B Moreover, the program can be transmitted over a radio path from a downloading site 321 through an artificial satellite 322 for digital satellite broadcasting to the personal computer 301, or transmitted through a network 331, a local area network or Internet, so as to be stored in the enclosed hard disc 302 in the personal computer 301, as shown in FIG. 28C.

The meaning of the medium in the specification is to be construed broadly to comprise all these mediums.

Also, the step of stating the program furnished by the medium may include not only the processing executed chronologically in accordance with a stated sequence but also the processing executed in parallel or separately without being processed chronologically.

In the present specification, the system is to be construed as meaning an entire apparatus made up of plural devices.

According to the present invention, a message asking a pre-set information furnishing device for recording control data is transmitted, the recording control data transmitted from the information furnishing device is received, a pre-set picture is recorded and recording is controlled based on the recording control data, so that the reservation recording can be set readily and promptly.

Moreover, according to the present invention, the recording control data is recorded, a message requesting the recording control data is received from a pre-set information processing device and the recording control data is transmitted to the information processing device, so that the reservation recording can be set readily and promptly.

In addition, according to the present invention, a message asking an information furnishing device for recording control data is transmitted, the recording control data transmitted from the information furnishing device is received, a pre-set picture is recorded, recording is controlled based on the recording control data, the recording control data is recorded, a message requesting the recording control data is received, and the recording control data is transmitted, so that the reservation recording can be set readily and promptly.

Furthermore, according to the present invention, the connection to a terminal having a browser function is set, responsive to the call from the terminal, data for controlling the browser function of the terminal is transmitted to the terminal, the recording control data transmitted from the terminal is received. A pre-set picture is recorded and recording is controlled based on the recording control data, reservation recording is feasible from remote places.

The invention claimed is:

1. An information processing apparatus comprising:
    means for acquiring data of a program table from an information furnishing apparatus;
    means for displaying said program table;
    means for requesting said information furnishing apparatus to send recording control data corresponding to a program indicated by a user from among programs of said program table via the Internet;
    means for receiving said recording control data sent from said information furnishing apparatus according to said request via the Internet;
    means for controlling a tuner and an encoder to record said program based on said recording control data; and
    means for recording said program.

2. An information processing method comprising:
    acquiring data of a program table from an information furnishing apparatus;
    requesting said information furnishing apparatus to send recording control data corresponding to a program indicated by a user from among programs of said program table via the Internet;
    receiving said recording control data sent from said information furnishing apparatus according to said request via the Internet;
    controlling a tuner and an encoder to record said program based on said recording control data; and
    recording said program.

3. A computer readable medium for permitting a computer to execute a program comprising:
    acquiring data of a program table from an information furnishing apparatus;
    requesting said information furnishing apparatus to send recording control data corresponding to a program indicated by a user from among programs of said program table via the Internet;
    receiving said recording control data sent from said information furnishing apparatus according to said request via the Internet;
    controlling a tuner and an encoder to record said program based on said recording control data; and
    recording said program.

4. An information furnishing apparatus comprising:
    means for storing data of a program table and recording control data corresponding to programs of said program table;
    means for receiving a message asking for data of said program table from an information processing apparatus and for transmitting said data to said information processing apparatus;
    means for receiving a request to send recording control data corresponding to a program indicated by a user from among programs of said program table from said information processing apparatus via the Internet; and
    means for sending said recording control data according to said request to said information processing apparatus via the Internet.

5. An information furnishing method comprising:
    storing data of a program table and recording control data corresponding to programs of said program table;
    receiving a message asking for data of said program table from an information processing apparatus and transmitting said data to said information processing apparatus;
    receiving a request to send recording control data corresponding to a program indicated by a user from among programs of said program table from said information processing apparatus via the Internet; and
    sending said recording control data according to said request to said information processing apparatus via the Internet.

6. A computer readable medium for permitting a computer to execute a program comprising:
    storing data of a program table and recording control data corresponding to programs of said program table;
    receiving a message asking for data of said program table from an information processing apparatus and transmitting said data to said information processing apparatus;
    receiving a request to send recording control data corresponding to a program indicated by a user from among programs of said program table from said information processing apparatus via the Internet; and
    sending said recording control data according to said request to said information processing apparatus via the internet.

* * * * *

UNITED STATES PATENT AND TRADEMARK OFFICE
CERTIFICATE OF CORRECTION

PATENT NO. : 7,076,152 B1
APPLICATION NO. : 09/720129
DATED : July 11, 2006
INVENTOR(S) : Tatsuo Eguchi et al.

It is certified that error appears in the above-identified patent and that said Letters Patent is hereby corrected as shown below:

Column 9, line 17, change "s" to --5--.

Column 23, line 35, change "IpdwIndex" to --lpdwIndex--;
    line 36, change "IpVChannel" to --lpVChannel--.

Column 24, line 13, place --Style-- on line 16 below first black line;
    line 19, change "IpdwIndex" to --lpdwIndex--;
    line 20, change "IpReservation" to --lpReservation--;
    line 23, change "IpdwIndex" to --lpdwIndex--; same line change "IpReservation" to --lpReservation--;
    line 26, change "IpdwIndex" to --lpdwIndex--; same line change "IpReservation" to --lpReservation--;
    line 41, change "IpdwIndex" to --lpdwIndex--;
    line 52, change "IpdwIndex" to --lpdwIndex--;
    line 53, change "IpReservation" to --lpReservation--.

Column 25, line 55, change "IpReservation" to --lpReservation--.

Signed and Sealed this

Twenty-seventh Day of March, 2007

JON W. DUDAS
*Director of the United States Patent and Trademark Office*